US011386306B1

(12) United States Patent
Siddiquie et al.

(10) Patent No.: US 11,386,306 B1
(45) Date of Patent: Jul. 12, 2022

(54) RE-IDENTIFICATION OF AGENTS USING IMAGE ANALYSIS AND MACHINE LEARNING

(71) Applicant: Amazon Technologies, Inc., Seattle, WA (US)

(72) Inventors: Behjat Siddiquie, Seattle, WA (US); Tian Lan, Seattle, WA (US); Jayakrishnan Eledath, Kenmore, WA (US); Hoi Cheung Pang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 16/219,870

(22) Filed: Dec. 13, 2018

(51) Int. Cl.
  *G06K 9/62* (2006.01)
  *G06N 20/00* (2019.01)
  *G06K 9/00* (2006.01)
  *G06V 40/10* (2022.01)

(52) U.S. Cl.
  CPC ......... *G06K 9/6269* (2013.01); *G06K 9/6256* (2013.01); *G06K 9/6276* (2013.01); *G06N 20/00* (2019.01); *G06V 40/103* (2022.01)

(58) Field of Classification Search
  CPC ............. G06K 9/6269; G06K 9/00369; G06K 9/6276; G06K 9/6256; G06N 20/00
  See application file for complete search history.

(56) References Cited

U.S. PATENT DOCUMENTS

| 6,185,314 | B1* | 2/2001 | Crabtree | G01S 3/7865 |
| | | | | 348/169 |
| 6,263,088 | B1* | 7/2001 | Crabtree | G01S 3/7865 |
| | | | | 348/169 |
| 7,225,980 | B2 | 6/2007 | Ku et al. | |
| 7,949,568 | B2 | 5/2011 | Fano et al. | |
| 8,009,864 | B2 | 8/2011 | Linaker et al. | |

(Continued)

FOREIGN PATENT DOCUMENTS

| CN | 102057371 A * | 5/2011 | ........... G06F 16/583 |
| WO | WO-2019079907 A1 * | 5/2019 | ............. G06N 20/00 |

OTHER PUBLICATIONS

FaceNet: A Unified Embedding for Face Recognition and Clustering Schroff et al.,; Proceedings of the IEEE Conference on Computer Vision and Pattern Recognition (CVPR), 2015, pp. 815-823.*

(Continued)

*Primary Examiner* — Charles T Shedrick
(74) *Attorney, Agent, or Firm* — Athorus, PLLC

(57) ABSTRACT

As agents move about a materials handling facility, tracklets representative of the position of each agent are maintained along with a confidence score indicating a confidence that the position of the agent is known. If the confidence score falls below a threshold level, image data of the agent associated with the low confidence score is obtained and processed to generate one or more embedding vectors representative of the agent at a current position. Those embedding vectors are then compared with embedding vectors of other candidate agents to determine a set of embedding vectors having a highest similarity. The candidate agent represented by the set of embedding vectors having the highest similarity score is determined to be the agent and the position of that candidate agent is updated to the current position, thereby re-identifying the agent.

23 Claims, 20 Drawing Sheets

(56) References Cited

U.S. PATENT DOCUMENTS

| | | | |
|---|---|---|---|
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 9,805,264 B2* | 10/2017 | Kuznetsova | G06K 9/00711 |
| 10,438,277 B1* | 10/2019 | Jiang | G06K 9/00664 |
| 10,552,750 B1* | 2/2020 | Raghavan | G06N 5/048 |
| 10,586,203 B1* | 3/2020 | Maldonado | G06Q 10/087 |
| 2003/0002712 A1* | 1/2003 | Steenburgh | G06K 9/00778 |
| | | | 382/103 |
| 2004/0181467 A1 | 9/2004 | Raiyani et al. | |
| 2004/0228503 A1* | 11/2004 | Cutler | G06K 9/00348 |
| | | | 382/103 |
| 2006/0083423 A1* | 4/2006 | Brown | G06K 9/00362 |
| | | | 382/159 |
| 2007/0211938 A1* | 9/2007 | Tu | G06K 9/00295 |
| | | | 382/170 |
| 2007/0217676 A1* | 9/2007 | Grauman | G06K 9/6212 |
| | | | 382/170 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0010490 A1* | 1/2009 | Wang | G06T 7/292 |
| | | | 382/103 |
| 2009/0052739 A1* | 2/2009 | Takahashi | G06K 9/00771 |
| | | | 382/103 |
| 2009/0121017 A1 | 5/2009 | Cato et al. | |
| 2009/0129631 A1* | 5/2009 | Faure | G06T 7/248 |
| | | | 382/103 |
| 2009/0245573 A1* | 10/2009 | Saptharishi | G06K 9/52 |
| | | | 382/103 |
| 2009/0324020 A1* | 12/2009 | Hasebe | G06T 7/00 |
| | | | 382/115 |
| 2010/0266159 A1* | 10/2010 | Ueki | G06K 9/00295 |
| | | | 382/103 |
| 2011/0011936 A1 | 1/2011 | Morandi et al. | |
| 2011/0080336 A1* | 4/2011 | Leyvand | G06K 9/00342 |
| | | | 345/156 |
| 2011/0085739 A1* | 4/2011 | Zhang | G06F 16/583 |
| | | | 382/218 |
| 2012/0020518 A1* | 1/2012 | Taguchi | G06T 7/292 |
| | | | 382/103 |
| 2012/0026335 A1* | 2/2012 | Brown | G01S 5/16 |
| | | | 348/159 |
| 2012/0093364 A1* | 4/2012 | Sato | G06T 7/277 |
| | | | 382/103 |
| 2012/0170804 A1* | 7/2012 | Lin | G06T 7/90 |
| | | | 382/103 |
| 2012/0284132 A1 | 11/2012 | Kim et al. | |
| 2013/0076898 A1 | 3/2013 | Philippe et al. | |
| 2013/0182114 A1* | 7/2013 | Zhang | A61B 5/0046 |
| | | | 348/150 |
| 2013/0182905 A1* | 7/2013 | Myers | A61B 5/1113 |
| | | | 382/103 |
| 2013/0253700 A1 | 9/2013 | Carson et al. | |
| 2014/0072170 A1* | 3/2014 | Zhang | G06K 9/00785 |
| | | | 382/103 |
| 2014/0072174 A1* | 3/2014 | Wedge | G06T 7/292 |
| | | | 382/103 |
| 2014/0107842 A1* | 4/2014 | Yoon | G05D 1/0248 |
| | | | 700/259 |
| 2014/0279294 A1 | 9/2014 | Field-Darragh et al. | |
| 2014/0328512 A1* | 11/2014 | Gurwicz | G06K 9/6263 |
| | | | 382/103 |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0146921 A1* | 5/2015 | Ono | H04N 7/18 |
| | | | 382/103 |
| 2015/0213328 A1* | 7/2015 | Mase | G06K 9/4671 |
| | | | 382/201 |
| 2016/0110613 A1* | 4/2016 | Ghanem | G06T 7/215 |
| | | | 382/103 |
| 2018/0107880 A1* | 4/2018 | Danielsson | G06K 9/00268 |
| 2018/0373928 A1* | 12/2018 | Glaser | G06F 9/54 |
| 2019/0033447 A1* | 1/2019 | Chan | G06K 9/2018 |
| 2019/0050629 A1* | 2/2019 | Olgiati | G06K 9/00261 |
| 2019/0065895 A1* | 2/2019 | Wang | G06K 9/6201 |
| 2019/0205965 A1* | 7/2019 | Li | G06Q 30/0643 |
| 2020/0184515 A1* | 6/2020 | deWet | G06Q 30/0254 |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

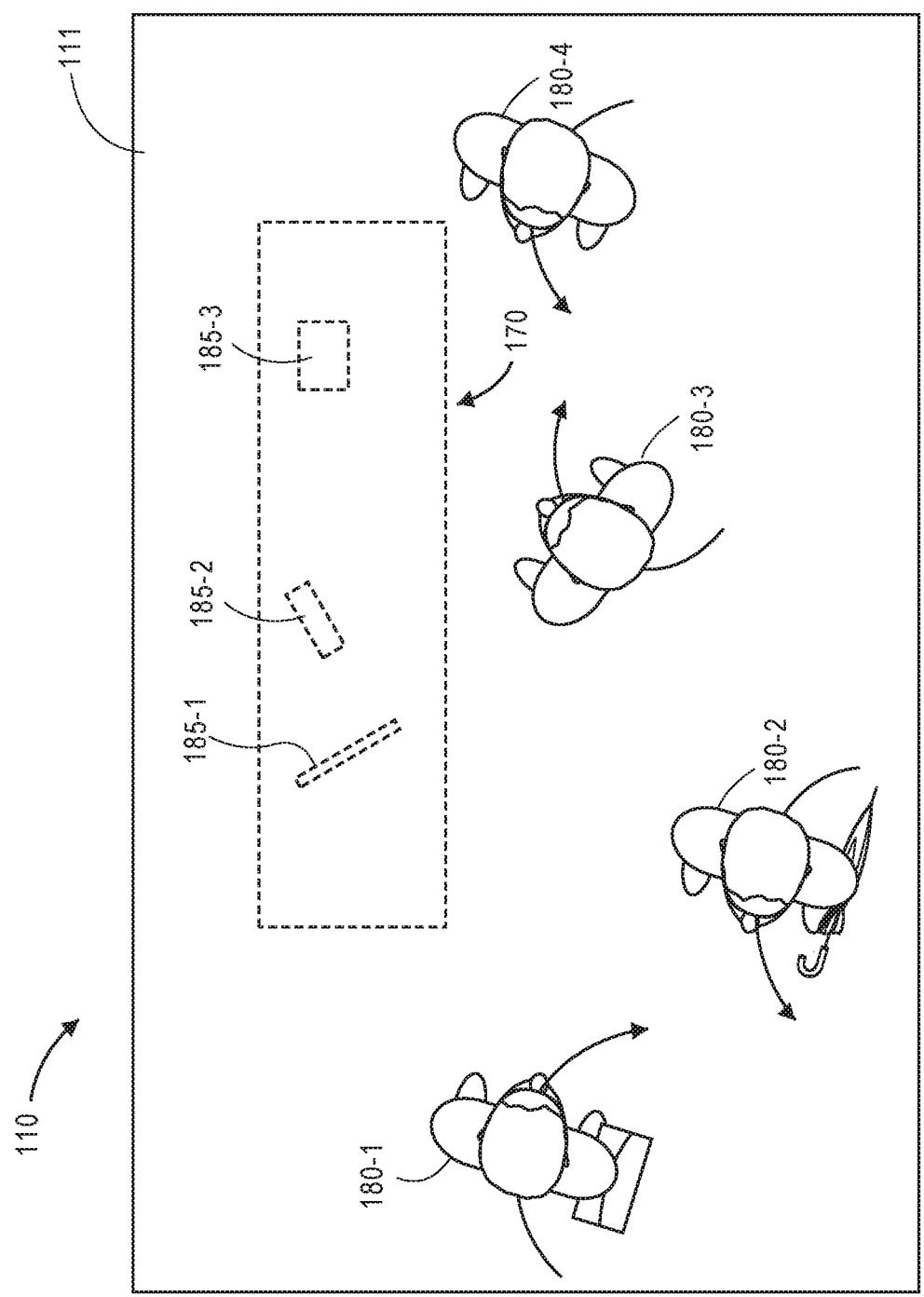

RE-IDENTIFICATION OF AGENTS USING IMAGE ANALYSIS AND MACHINE LEARNING

BACKGROUND

Today, imaging devices such as digital cameras are frequently used for monitoring operations. For example, digital cameras are often used to monitor the arrivals or departures of goods or the performance of services in materials handling facilities such as warehouses, fulfillment centers, retail establishments or other like facilities. Digital cameras are also used to monitor the travels of persons or objects in locations such as airports, stadiums or other dense environments, or the flow of traffic on one or more sidewalks, roadways or highways. Additionally, digital cameras are commonplace in financial settings such as banks or casinos, where money changes hands in large amounts or at high rates of speed.

A plurality of digital cameras (or other imaging devices) may be provided in a network, and aligned and configured to capture imaging data such as still or moving images of actions or events occurring within their respective fields of view. The digital cameras may include one or more sensors, processors and/or memory components or other data stores. Information regarding the imaging data or the actions or events depicted therein may be subjected to further analysis by one or more of the processors operating on the digital cameras to identify aspects, elements or features of the content expressed therein.

BRIEF DESCRIPTION OF THE DRAWINGS

FIGS. 1A through 1J are views of aspects of one system for re-identification of an agent using digital imagery and machine learning in accordance with implementations of the present disclosure.

DETAILED DESCRIPTION

Figure 1A:
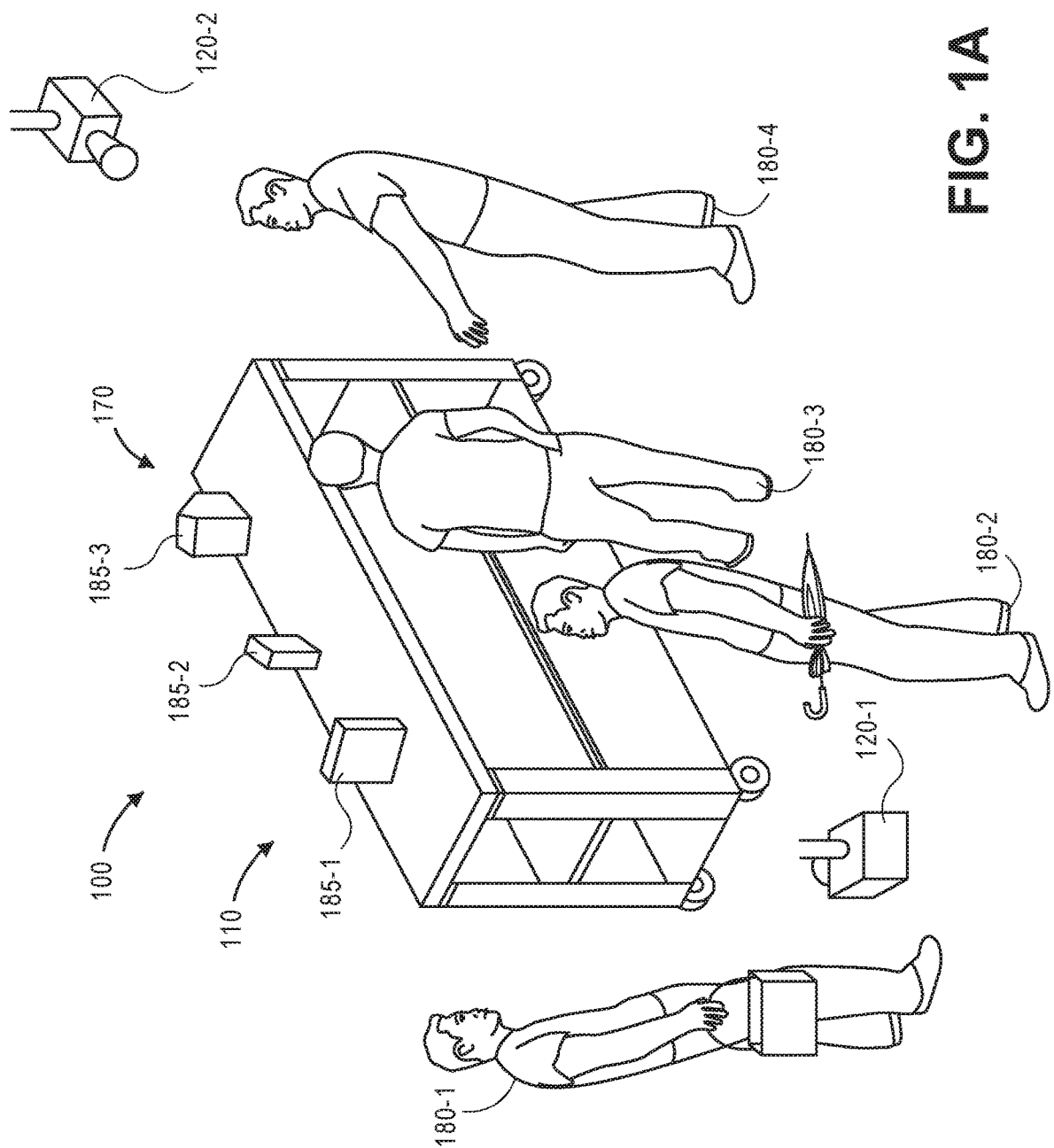

As is set forth in greater detail below, the present disclosure is directed to processing digital imagery captured from one or more fields of view to re-identify agents (e.g., users, workers, customers or other personnel) within a materials handling facility. More specifically, one or more implementations of the present disclosure are directed to imaging devices (e.g., digital cameras) that are configured to capture imaging data and to processing of the imaging data using one or more machine learning systems or techniques operating on the imaging devices, or on one or more external devices or systems. The imaging devices may provide imaging data (e.g., images or image frames) as inputs to the machine learning systems or techniques, and determine, for one or more segments of the imaging data a feature set that includes one or more embedding vectors representative of the segment of the imaging data. As agents move about the materials handling facility, the position or location of the agent may be continuously or periodically determined. Each time an agent's position is determined, a tracklet score is generated indicating a confidence that the position of the agent is known. If the tracklet score falls below a threshold, it is determined that there is a low confidence that the position of the agent is known and the agent is to be re-identified. A low confidence tracklet score may occur, for example, if the agent moves into an area of the materials handling facility that is not covered or within the field of view of one or more imaging devices, moves into a position in which the agent is occluded in the field of view of the imaging device(s), comes into close proximity of another agent, etc.

When a tracklet score falls below a threshold, or it is otherwise determined that the agent is to be re-identified, one or more images of the agent are obtained and processed to generate a feature set that includes one or more embedding vectors of the agent to be re-identified. The one or more embedding vectors of the agent are then compared, using a machine learning model, with embedding vectors of other agents within the materials handling facility and/or within a defined area around the current position of the agent to be re-identified. For each comparison, a similarity score is computed indicating a similarity between the embedding vector(s) of the agent to be re-identified and the embedding vector(s) of other agents. The agent with the highest similarity score is determined to be the agent that is to be re-identified and the position of that agent is updated to the current position of the agent to be re-identified.

As one example, an agent, Agent 1, at a current position is to be re-identified. Upon determining that Agent 1 at the current position is to be re-identified, one or more images of Agent 1 are obtained and processed to generate embedding vector(s) of Agent 1 at the current position. Likewise, a candidate set of agents are also determined, in this example, Agent A, Agent B, and Agent C. Embedding vector(s) of each of Agent A, Agent B, and Agent C are generated or obtained and compared with the embedding vector(s) of Agent 1. For example, using a machine learning system, the embedding vector(s) for Agent 1 are compared with the embedding vector(s) for Agent A to produce a first similarity score; the embedding vector(s) for Agent 1 are compared with the embedding vector(s) for Agent B to produce a second similarity score; and the embedding vector(s) for Agent 1 are compared with the embedding vector(s) for Agent C to produce a third similarity score. It is then determined that one of the similarity scores, such as first similarity score, is a highest similarity score. The agent with the highest similarity score, in this example, Agent A, is determined to be the agent to be re-identified and the position of Agent A is updated to be the current position and it is determined that Agent 1 is Agent A. In some implementations, a confidence score may be determined indicating a confidence that the agent with the highest similarity score is indeed the agent to be re-identified. Confidence score determination is discussed in further detail below.

Figure 1B:
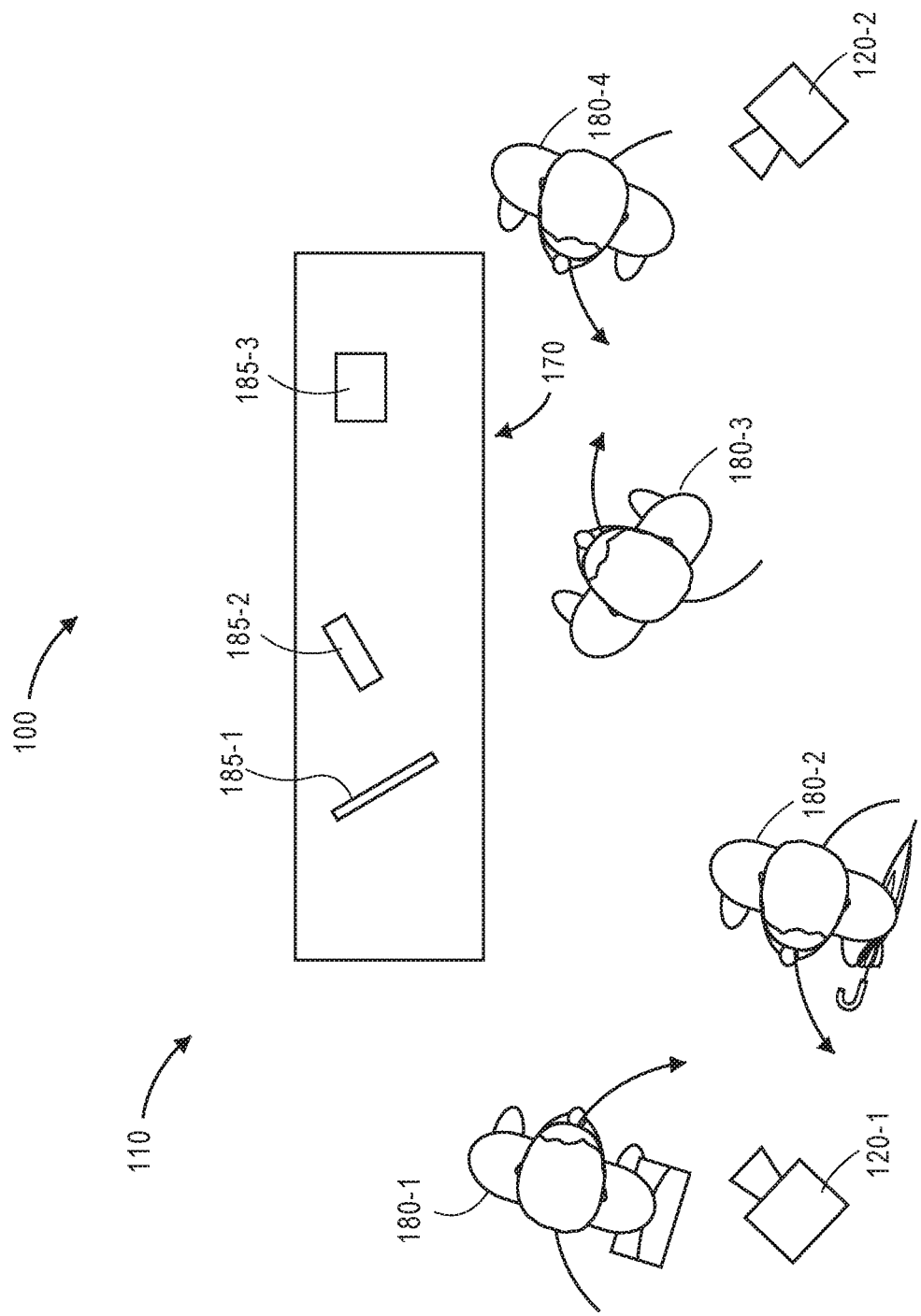
Figure 1D:
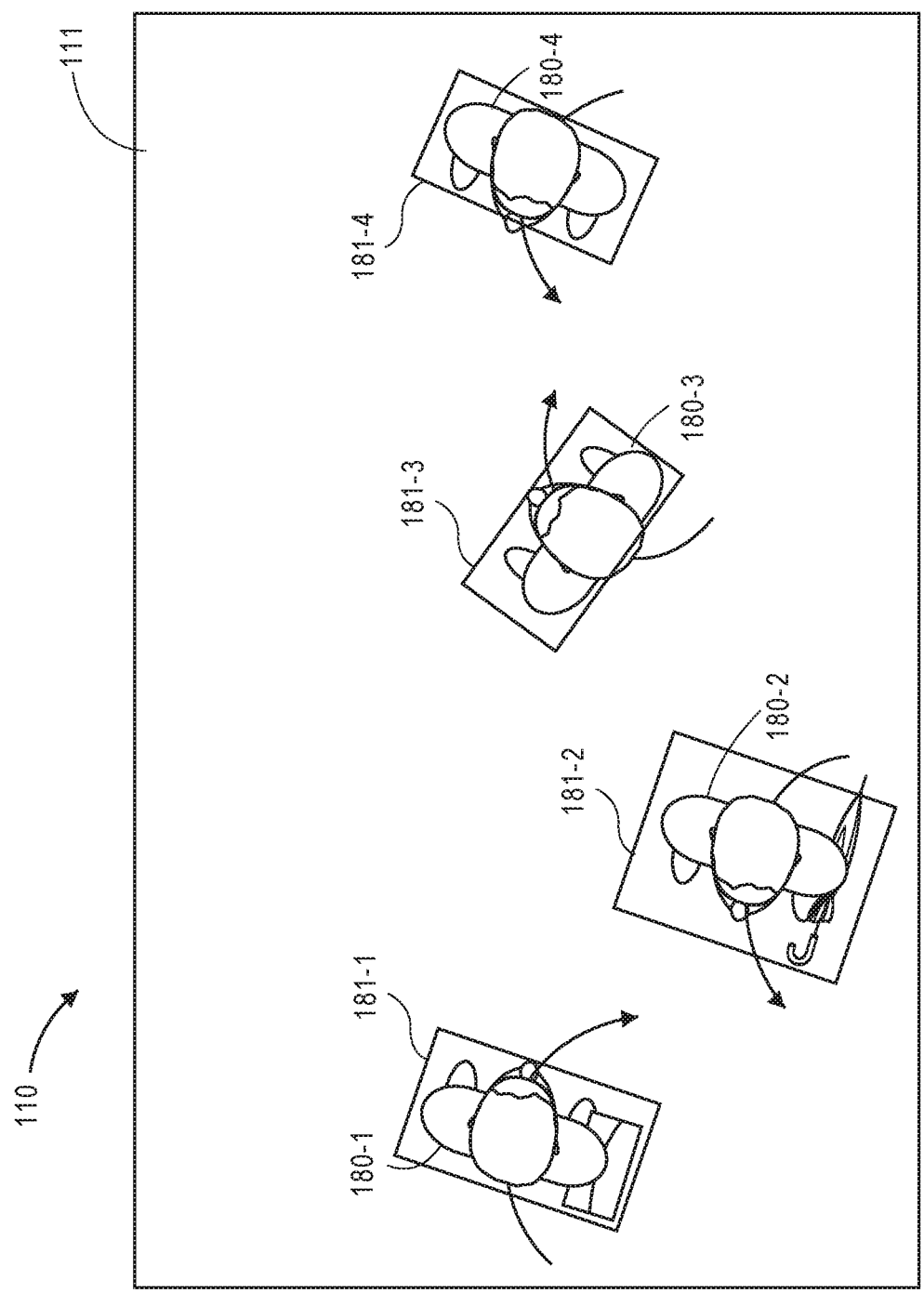

Referring to FIGS. 1A through 1J, views of aspects of one system 100 for re-identification of agents using digital imagery and machine learning in accordance with implementations of the present disclosure are shown. As is shown in FIGS. 1A and 1B, the system 100 includes a scene 110 such as a materials handling facility, a fulfillment center, a warehouse, or any other like facility. The scene 110 includes a pair of imaging devices 120-1, 120-2 (e.g., digital cameras), and may include other things, such as a storage unit 170 (e.g., a set of inventory shelves) and/or items 185-1, 185-2, 185-3.

As is shown in FIGS. 1A and 1B, the imaging devices 120-1, 120-2 are aligned with fields of view that overlap at least in part over a portion of the scene 110, and are configured to generate imaging data, such as still or moving images, from the scene 110. The imaging devices 120-1, 120-2 may be installed or otherwise operated independently or as components of an imaging device network (or camera network), and may be in communication with one or more computer devices or systems, e.g., over one or more computer networks.

The scene 110 may be any open or enclosed environment or space in which any number of agents (e.g., humans, other animals or machines) may be present or pass through the field of view of one or more of the imaging devices 120-1, 120-2, such as agents 180-1, 180-2, 180-3, 180-4 as shown in FIG. 1A. For example, as is shown in FIG. 1B, the agents 180-1, 180-2, 180-3, 180-4 are in motion within a vicinity of the shelving unit 170, and each is partially or entirely within the fields of view of the imaging devices 120-1, 120-2. The locations/positions and/or motion of the agents 180-1, 180-2, 180-3, 180-4 may be detected and tracked, such that a trajectory, or "tracklet," representative of locations/positions or motion of one or more agents 180-1, 180-2, 180-3, 180-4 on the scene 110 may be generated based on the presence of such agents within images captured by a single imaging device, e.g., from a common field of view, or within images captured by multiple imaging devices. The trajectories may be generated over a predetermined number or series of frames (e.g., tens of frames or more), subject to any compatibility or incompatibility parameters or constraints.

In some implementations, an image may be processed and/segmented prior to submission of a portion of the image to a machine learning system. For example, an image may be processed using one or both of foreground segmentation or background segmentation to aid in distinguishing agents 180 from background objects of the scene 110. For example, FIG. 1C illustrates an overhead view of the scene 110 obtained by an overhead imaging device, such as a digital still camera. The digital image 111 of the scene 110 is processed using one or both of foreground segmentation and/or background segmentation to distinguish foreground objects, in this example agents 180-1, 180-2, 180-3, and 180-4 from background objects 170, 185-1, 185-2, and 185-3, illustrated now by dashed lines. In some implementations, a background image representation of the scene when there are no foreground objects present may be maintained in a data store and compared with the current image of the scene 110 to subtract out objects present in both images, leaving only foreground objects. In other implementations, other techniques or algorithms that are known to those skilled in the art may be used to perform foreground and/or background segmentation of the image.

In addition to performing foreground and/or background segmentation, in some implementations, additional processing of the segmented image may be performed to further segment out each agent represented in the image. For example, an object detection algorithm, such as You Only Look Once (YOLO) may be used to process the image, a series of images, the segmented image, or a series of segmented images to detect each object, in this example the agents represented in the scene, and a bounding box, such as a rectangle, may be positioned around each agent to encompass the detected agent. For example, referring to FIG. 1D, an object detection algorithm has further processed the segmented image 111 of the scene to detect agents 180-1, 180-2, 180-3, and 180-4 and bounding boxes 181-1, 181-2, 181-3, and 181-4 are positioned around each detected agent 180 to encompass or define the pixels of the image 111 that correspond to or represent each agent. As discussed in further detail below, the pixels of the image data within each bounding box may be independently processed by a machine learning system to produce an embedding vector representative of each agent.

While this example describes both foreground and/or background subtraction and image segmentation using object detection to detect and extract portions of the image representative of agents, in some implementations foreground and/or background subtraction may be omitted and images may be processed to identify and extract pixels representative of agents using only segmentation, such as an object detection algorithm.

Figure 1E:
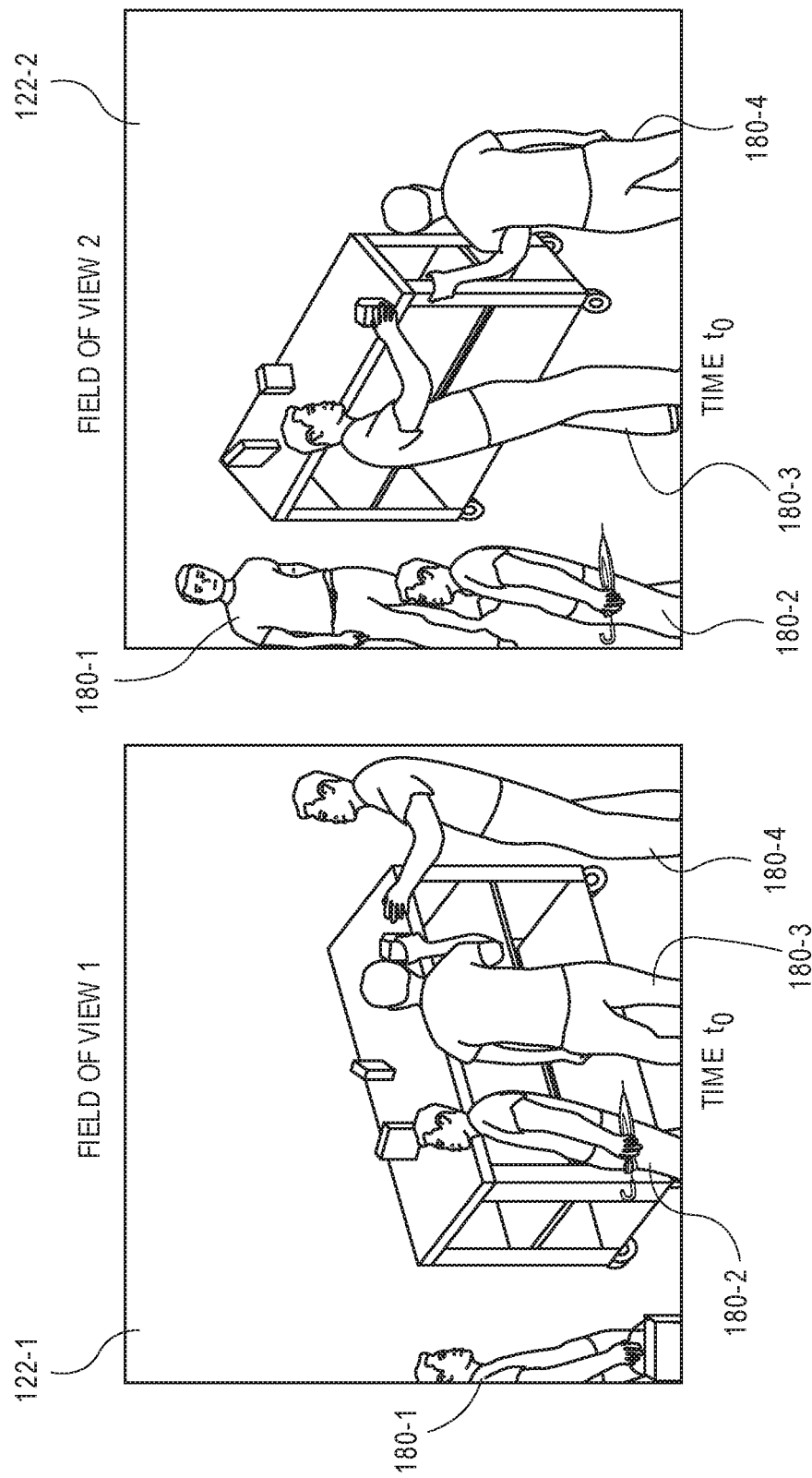

In some implementations, multiple fields of view of a scene may be processed as discussed above and utilized together to re-identify agents in the scene. For example, FIG. 1E illustrates digital images of two fields of view 122-1 and 122-2 of the scene 110 at time $t_0$ obtained by imaging devices 120-1, 120-2. The digital images may be processed to segment out the agents 180-1, 180-2, 180-3, and 180-4 so that the segmented out agents can be efficiently processed by machine learning systems to re-identify one or more of those agents. The images 122-1, 122-2 depict the positions of the respective agents 180-1, 180-2, 180-3, 180-4 within the fields of view of the imaging devices 120-1, 120-2 at the time $t_0$. Moreover, the digital images 122-1, 122-2 may include visual images, depth images, or visual images and depth images.

Figure 1F:
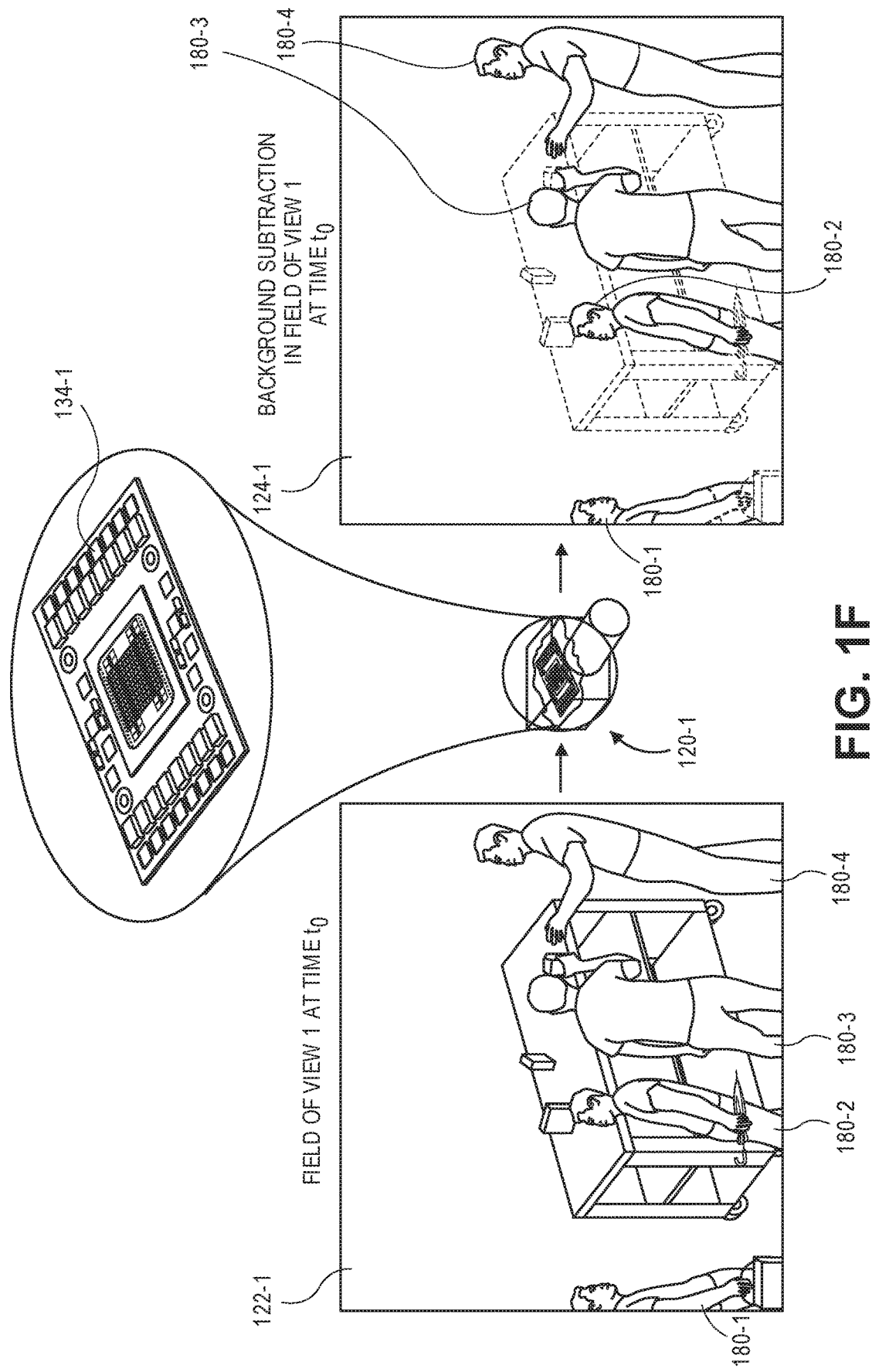
Figure 1G:
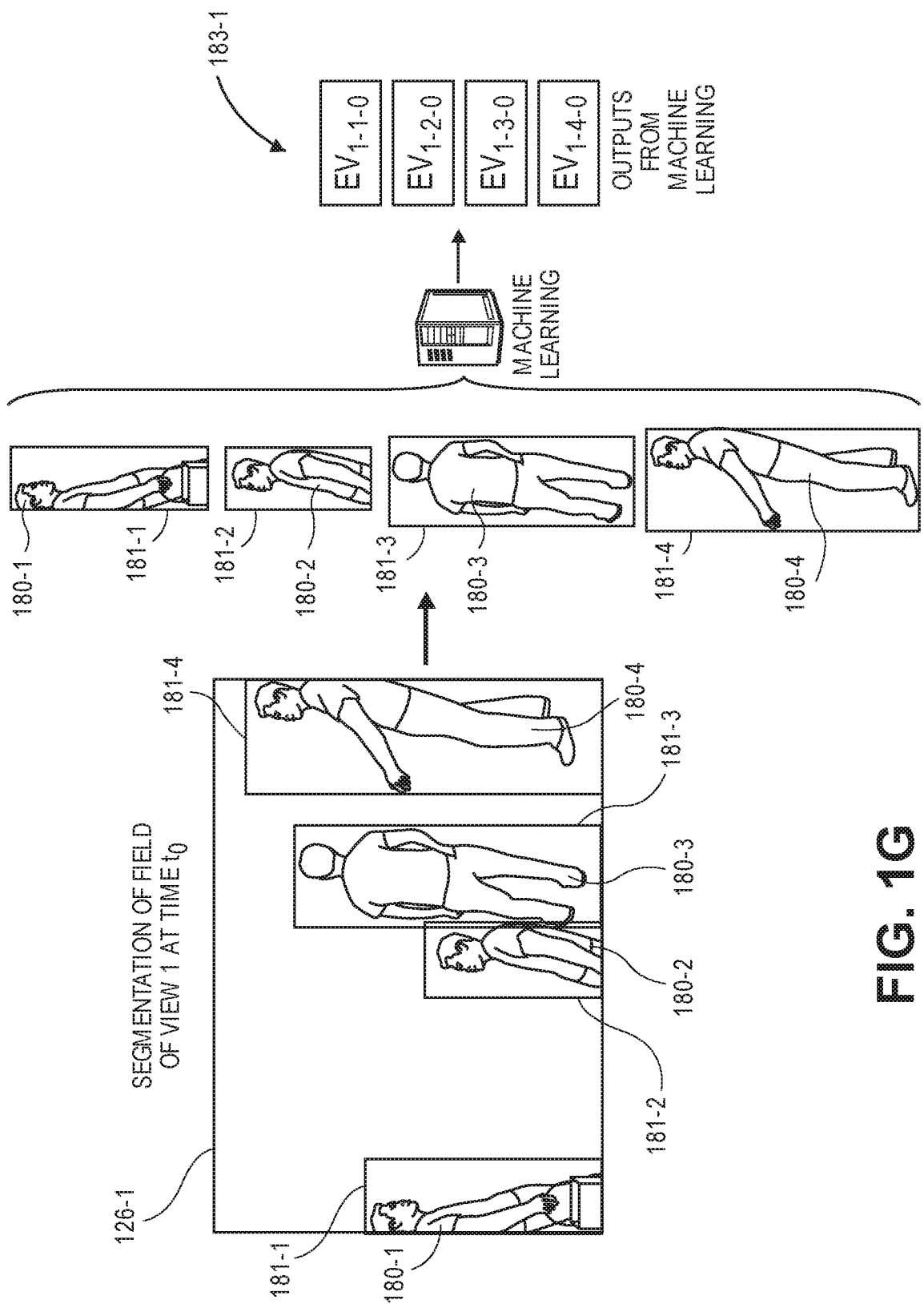

In some implementations of the present disclosure, imaging devices may be programmed to execute one or more machine learning systems or techniques that are trained to re-identify agents represented in the scene. For example, as is shown in FIG. 1F, a processor unit 134-1 operating on the imaging device 120-1 may receive the image 122-1 captured by the imaging device 120-1 at the time $t_0$ (or substantially at the time $t_0$), and perform background/foreground processing to produce a foreground record 124-1 that includes the agents 180-1, 180-2, 180-3, 180-4 that are depicted within the image 122-1. Additionally, as illustrated in FIG. 1G, the processor unit 134-1 may further segment the image using an object detection algorithm, such as YOLO, to detect the agents 180-1, 180-2, 180-3, and 180-4 and define bounding boxes 181-1, 181-2, 18-3, and 182-14 around those agents thereby defining the segments of the record 126-1 representative of each agent. Finally, the processor unit 134-1 may independently process the portion of the digital image contained within each bounding box 181 to produce embedding vectors 183-1 representative of each agent 180-1, 180-2, 180-3, and 180-4. In this example, processing of the segment of the digital image contained within bounding box 181-1 produces embedding vector $EV_{1-1-0}$, processing of the segment of the digital image contained within bounding box 181-2 produces embedding vector $EV_{1-2-0}$, processing of the segment of the digital image contained within bounding box 181-3 produces embedding vector $EV_{1-3-0}$, and processing of the segment of the digital image contained within bounding box 181-4 produces embedding vector $EV_{1-4-0}$. The machine learning systems or techniques may be any type or form of tool that is trained to produce embedding vectors representative of agents. In some implementations, a processor unit provided on an imaging device may be programmed to execute a fully convolutional network (e.g., a residual network, such as a deep residual learning network) on inputs including images captured thereby. Alternatively, the one or more machine learning systems or techniques that are trained to detect agents may be executed by one or more computer devices or machines in other locations, e.g., alternate or virtual locations, such as in a "cloud"-based environment. For example, the background/foreground subtraction of the image data and the segmentation of the image data with bounding boxes may be performed by the imaging device. The additional processing to produce embedding vectors 183-1 using machine learning systems or techniques may be executed by one or more computing devices or machines that are separate from the imaging devices.

The resultant embedding vectors are associated with each agent 180, or tracklet corresponding to each agent and used when and if needed for re-identification of the agent, as discussed further below. An embedding vector, as used herein, is produced from a machine learning and/or deep network and is a vector representation of an object, such as an agent. For example, an embedding vector may include continuous data, such as a series of floating point numbers indicative of object attributes of the object. Object attributes include anything about the object, including, but not limited to, color, size, shape, texture, etc.

Figure 1H:
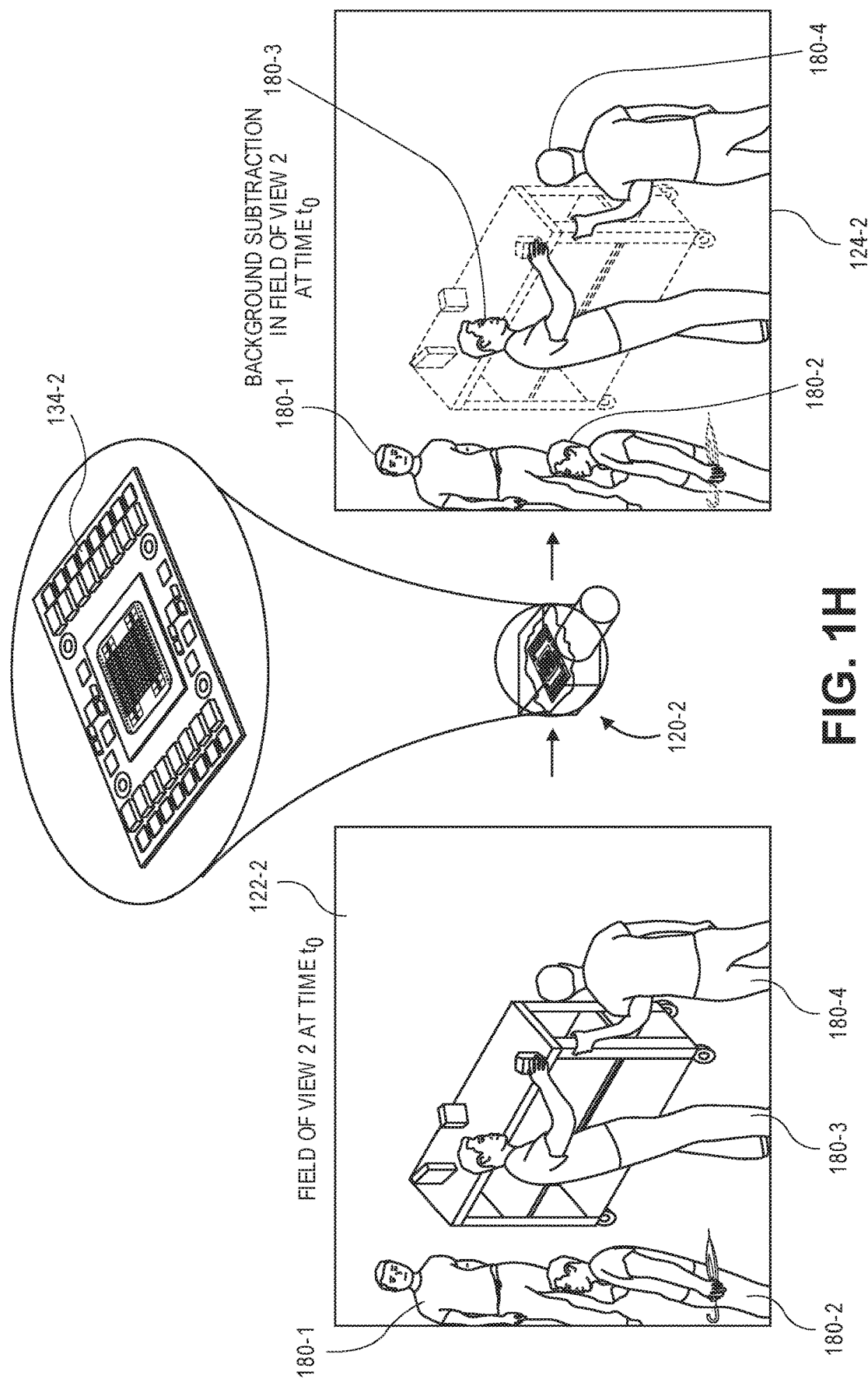
Figure 1I:
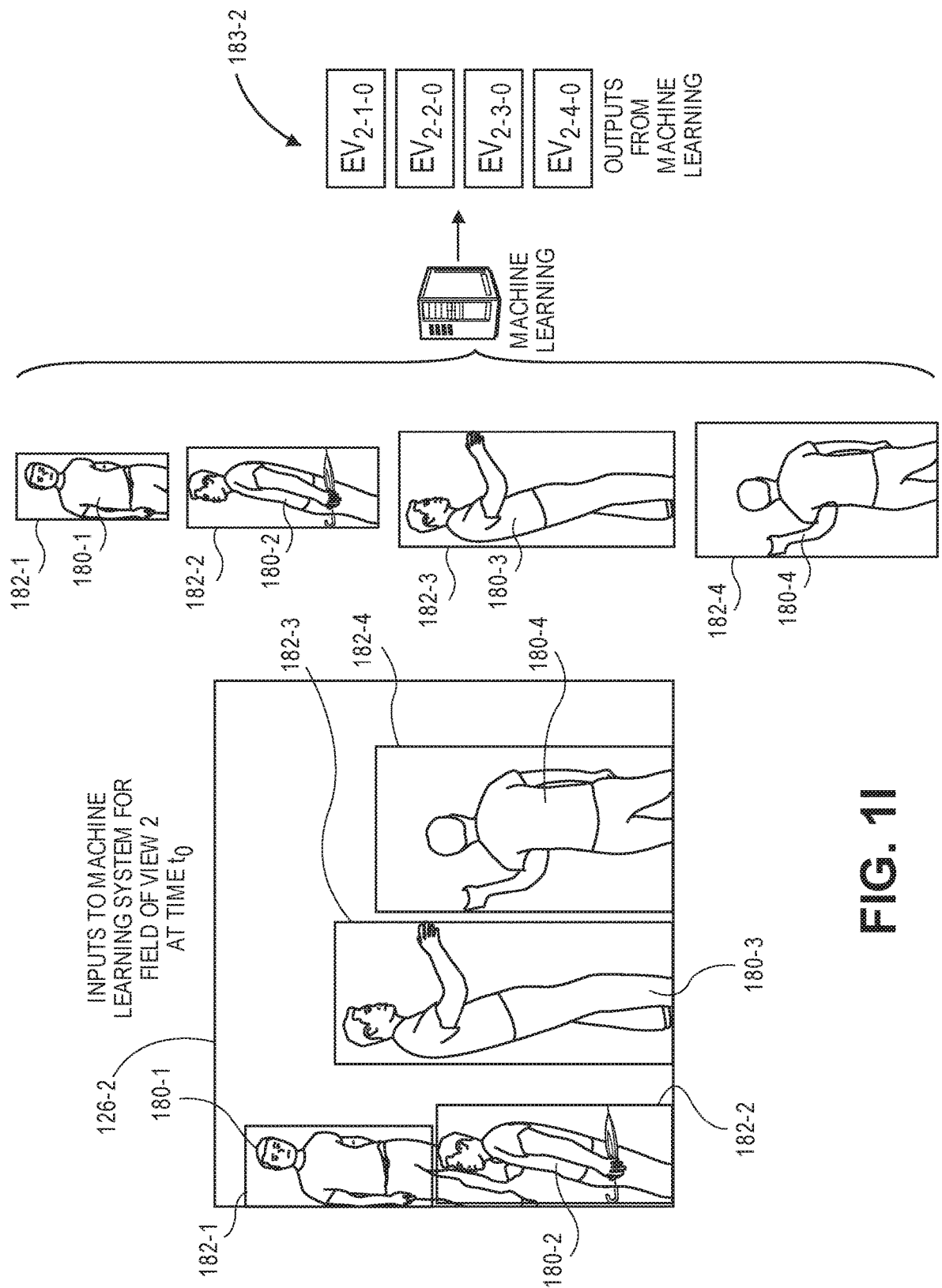

Likewise, as is shown in FIG. 1H, a processor unit 134-2 operating on the imaging device 120-2 may receive the image 122-2 captured by the imaging device 120-2 at the time $t_0$, and perform background/foreground processing to produce a foreground record 124-2 that includes the agents 180-1, 180-2, 180-3, 180-4 that are depicted within the image 122-2. Additionally, as illustrated in FIG. 1I, the processor unit 134-2 may further segment the image using an object detection algorithm, such as YOLO, to detect the agents 180-1, 180-2, 180-3, and 180-4 and define bounding boxes 182-1, 182-2, 182-3, and 182-4 around those agents thereby defining the segments of the record 126-2 representative of each agent. Finally, the processor unit 134-2 may independently process the portion of the digital image contained within each bounding box 182 to produce embedding vectors 183-2 representative of each agent 180-1, 180-2, 180-3, and 180-4. In this example, processing of the segment of the digital image contained within bounding box 182-1 produces embedding vector $EV_{2-1-0}$, processing of the segment of the digital image contained within bounding box 182-2 produces embedding vector $EV_{2-2-0}$, processing of the segment of the digital image contained within bounding box 182-3 produces embedding vector $EV_{2-3-0}$, and processing of the segment of the digital image contained within bounding box 182-4 produces embedding vector $EV_{2-4-0}$. As discussed above, the machine learning systems or techniques may be any type or form of tool that is trained to produce embedding vectors representative of agents. In some implementations, a processor unit provided on an imaging device may be programmed to execute a fully convolutional network (e.g., a residual network, such as a deep residual learning network) on inputs including images captured thereby. Alternatively, the one or more machine learning systems or techniques that are trained to detect agents may be executed by one or more computer devices or machines in other locations, e.g., alternate or virtual locations, such as in a "cloud"-based environment. As illustrated in FIG. 1I, the background/foreground subtraction of the image data and the segmentation of the image data with bounding boxes may be performed by the imaging device the additional processing to produce embedding vectors 183-2 using machine learning systems or techniques may be executed by one or more computing devices or machines that are separate from the imaging devices.

Figure 1J:
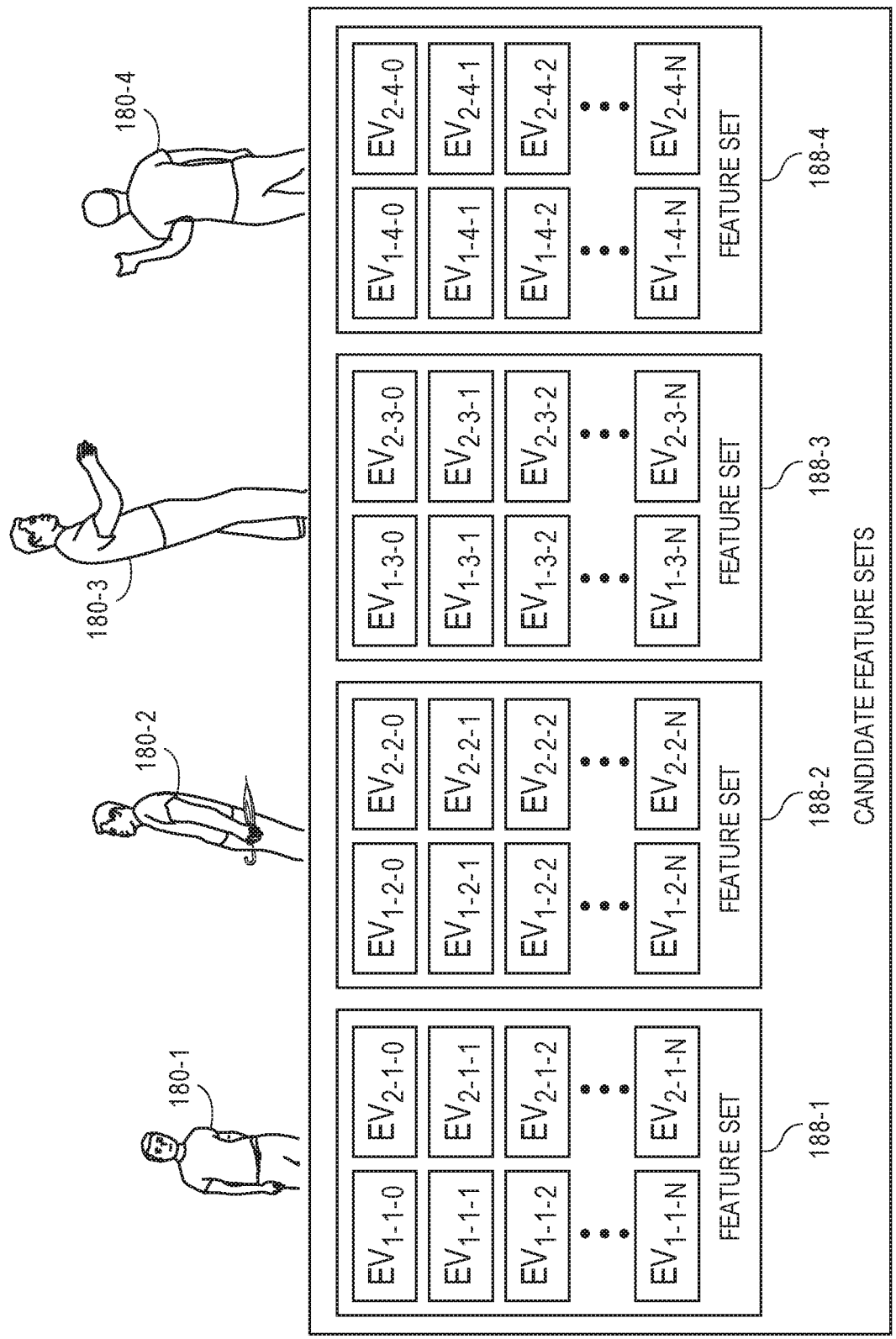

As illustrated in FIG. 1J, the resultant embedding vectors 183-1, 183-2 are associated with each agent 180, or tracklet corresponding to each agent to produce feature sets 188 that are used when and if needed for re-identification of agents, as discussed further below. The feature sets may include embedding vectors generated for each agent from different fields of view from different imaging devices and/or over different periods of time. In some implementations, each field of view of the agent that is captured and processed may be included in the feature set 188 for that agent. In other examples, less than all of the embedding vectors may be included in the feature set and/or older embedding vectors may be replaced in the feature set as newer embedding vectors representative of the agent are generated. For example, each new embedding vector may be compared with existing embedding vectors. If the new embedding vector is very similar to an existing embedding vector, the existing embedding vector may be given a higher weight or score and the new embedding vector discarded. In comparison, if the new embedding vector is significantly different than existing embedding vectors associated with the agent, it may be retained in the feature set as representative of the agent.

By associating multiple embedding vectors generated from different fields of view, such as embedding vectors 183-1 and 183-2 and retaining significantly distinct embedding vectors as part of the feature set for an agent, re-identification is more robust as different views of the same agent may be compared and processed with the agent to be re-identified, as discussed below.

For example, the first agent 180-1, or the first tracklet for agent 180-1, will have an associated feature set 188-1 that includes embedding vectors generated over a period of time from image data generated by two different imaging devices. In this example, feature set 188-1 for agent 180-1 includes embedding vectors $EV_{1-1-0}$, $EV_{1-1-1}$, $EV_{1-1-2}$ through $EV_{1-1-N}$, each generated from image data of a first imaging device that has been segmented to include the first agent 180-1, during different periods of time from $t_0$ through $t_N$. In addition, the feature set 188-1, in this example, also includes embedding vectors $EV_{2-1-0}$, $EV_{2-1-1}$, $EV_{2-1-2}$ through $EV_{2-1-N}$, each generated from image data of a second imaging device that has been segmented to include the first agent 180-1, during different periods of time from $t_0$ through $t_N$.

Likewise, the second agent 180-2, or the second tracklet for agent 180-2, will have an associated feature set 188-2 that includes embedding vectors generated over a period of time from image data generated by two different imaging devices. In this example, feature set 188-2 for agent 180-2 includes embedding vectors $EV_{1-2-0}$, $EV_{1-2-1}$, $EV_{1-2-2}$ through $EV_{1-2-N}$, each generated from image data of a first imaging device, that has been segmented to include the second agent 180-2, during different periods of time from $t_0$ through $t_N$. In addition, the feature set 188-2, in this example, also includes embedding vectors $EV_{2-2-0}$, $EV_{2-2-1}$, $EV_{2-2-2}$ through $EV_{2-2-N}$, each generated from image data of a second imaging device that has been segmented to include the first agent 180-2, during different periods of time from $t_0$ through $t_N$.

The third agent 180-3, or the third tracklet for agent 180-3, will have an associated feature set 188-3 that includes embedding vectors generated over a period of time from image data generated by two different imaging devices. In this example, feature set 188-3 for agent 180-3 includes embedding vectors $EV_{1-3-0}$, $EV_{1-3-1}$, $EV_{1-3-2}$ through $EV_{1-3-N}$, each generated from image data of a first imaging device, that has been segmented to include the third agent 180-3, during different periods of time from $t_0$ through $t_N$. In addition, the feature set 188-3, in this example, also includes embedding vectors $EV_{2-3-0}$, $EV_{2-3-1}$, $EV_{2-3-2}$ through $EV_{2-3-N}$, each generated from image data of a second imaging device that has been segmented to include the first agent 180-3, during different periods of time from $t_0$ through $t_N$.

The fourth agent 180-4, or the fourth tracklet for agent 180-4, will have an associated feature set 188-4 that includes embedding vectors generated over a period of time from image data generated by two different imaging devices. In this example, feature set 188-4 for agent 180-4 includes embedding vectors $EV_{1-4-0}$, $EV_{1-4-1}$, $EV_{1-4-2}$ through $EV_{1-4-N}$, each generated from image data of a first imaging device, that has been segmented to include the fourth agent 180-4, during different periods of time from $t_0$ through $t_N$. In addition, the feature set 188-4, in this example also includes embedding vectors $EV_{2-4-0}$, $EV_{2-4-1}$, $EV_{2-4-2}$ through $EV_{2-4-N}$, each generated from image data of a second imaging device, that has been segmented to include the first agent 180-4, during different periods of time from $t_0$ through $t_N$.

As will be appreciated, additional embedding vectors from other fields of view of other imaging devices taken at the same or different times may likewise be included in one or more of the feature sets for different agents. Likewise, in some implementations, embedding vectors may be associated with an anonymous indicator corresponding to the agent such that the actual identity of the agent is not known and/or maintained by the implementations described herein.

As discussed herein, the embedding vectors of feature sets of agents may be maintained in a data store and/or generated on-demand and used to re-identify an agent and/or a position of an agent within a materials handling facility. Likewise, as discussed below, embedding vectors may be used as initial and/or ongoing training inputs to the machine learning system to increase the accuracy of re-identification of agents within the materials handling facility. For example, embedding vectors of a known image of an agent may be identified as an anchor training input and two other embedding vectors, one of which corresponds to another known image of the same agent and one of which corresponds to an image of a different agent may be provided as positive and negative inputs. Those inputs may be used to train the machine learning system to distinguish between similar and different embedding vectors representative of agents.

In some implementations, agents may have the option to consent or selectively decide what imaging data may be used, stored, and/or maintained in a data store and/or used as inputs or training to the machine learning system and/or implementations discussed herein.

In some implementations, such as where the scene 110 includes a substantially large number of imaging devices, or where a substantially large number of images must be evaluated to re-identify an agent, the images may be evaluated to determine their respective levels of quality by any algorithm or technique, e.g., one or more trained machine learning systems or techniques, such as a convolutional neural network or another artificial neural network, or a support vector machine (e.g., a linear support vector machine) or another classifier. Images may be selected or excluded from consideration for generation of embedding vectors, or the confidence scores of the various agents depicted within such images may be adjusted accordingly, in order to enhance the likelihood that an agent may be properly re-identified.

Accordingly, implementations of the systems and methods of the present disclosure may capture imaging data from a scene using a plurality of digital cameras or other imaging devices that are aligned with various fields of view. In some implementations, two or more of the digital cameras or other imaging devices may have fields of view that overlap with one another at least in part, such as the imaging devices 120-1, 120-2 of FIGS. 1A and 1B. In other implementations, the digital cameras or other imaging devices need not have overlapping fields of view.

Those of ordinary skill in the pertinent arts will recognize that imaging data, e.g., visual imaging data, infrared imaging data, radiographic imaging data, or imaging data of any other type or form, may be captured using one or more imaging devices such as digital cameras, infrared cameras, radiographic cameras, etc. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green, or blue) of the reflected light. Such sensors may then generate data files including such information, and store such data files in one or more onboard or accessible data stores (e.g., a hard drive or other like component), or in one or more removable data stores (e.g., flash memory devices). Such data files, also referred to herein as imaging data, may also be printed, displayed on one or more broadcast or closed-circuit television networks, or transmitted over a computer network, such as the Internet.

An imaging device that is configured to capture and store visual imaging data (e.g., color images) is commonly called an RGB ("red-green-blue") imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; YOLO method; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which re-identification of an agent is desired, including but not limited to identifying agents involved in events occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between agents (e.g., customers) and recognize their respective interactions within a materials handling facility, including but not limited to interactions with one or more items (e.g., consumer goods) within the materials handling facility. Such systems and methods may also be utilized to identify and locate agents and their interactions within transportation centers, financial institutions or like structures in which diverse collections of people, objects or machines enter and exit from such environments at regular or irregular times or on predictable or unpredictable schedules.

Figure 2:
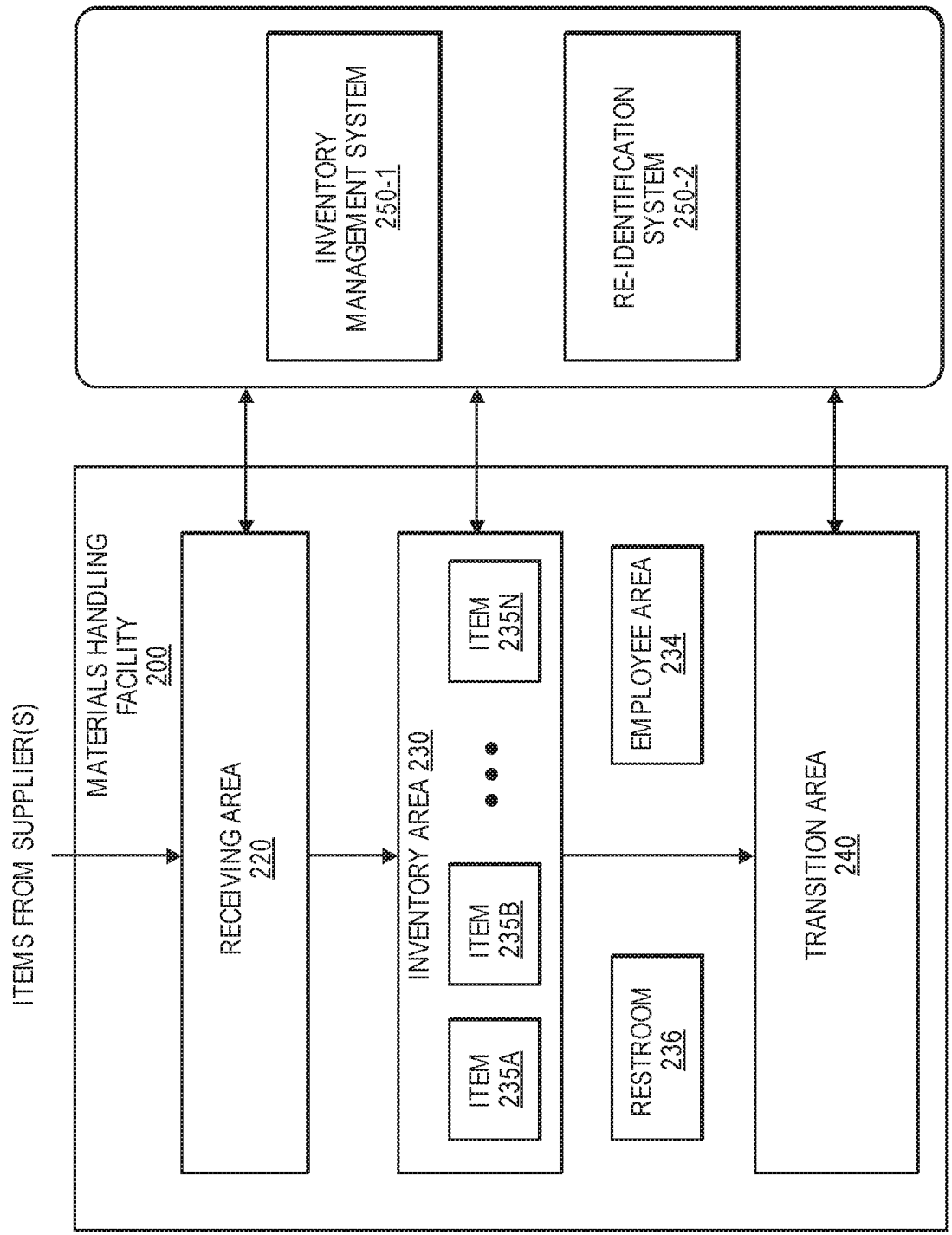
FIG. 2 is a block diagram illustrating a materials handling facility in accordance with implementations of the present disclosure.

An implementation of a materials handling facility configured to store and manage inventory items is illustrated in FIG. 2. As shown, a materials handling facility 200 includes a receiving area 220, an inventory area 230 configured to store an arbitrary number of inventory items 235A, 235B, through 235N, one or more transition areas 240, one or more restrooms 236, and one or more employee areas 234 or break-rooms. The arrangement of the various areas within materials handling facility 200 is depicted functionally rather than schematically. For example, in some implementations, multiple different receiving areas 220, inventory areas 230 and transition areas 240 may be interspersed rather than segregated. Additionally, the materials handling facility 200 includes an inventory management system 250-1 configured to interact with each of receiving area 220, inventory area 230, transition area 240 and/or agents within the materials handling facility 200. Likewise, the materials handling facility includes a re-identification system 250-2 configured to interact with image capture devices at each of the receiving area 220, inventory area 230, and/or transition area 240 and to track agents as they move throughout the materials handling facility 200.

The materials handling facility 200 may be configured to receive different kinds of inventory items 235 from various suppliers and to store them until an agent orders or retrieves one or more of the items. The general flow of items through the materials handling facility 200 is indicated using arrows. Specifically, as illustrated in this example, items 235 may be received from one or more suppliers, such as manufacturers, distributors, wholesalers, etc., at receiving area 220. In various implementations, items 235 may include merchandise, commodities, perishables, or any suitable type of item depending on the nature of the enterprise that operates the materials handling facility 200.

Upon being received from a supplier at receiving area 220, items 235 may be prepared for storage. For example, in some implementations, items 235 may be unpacked or otherwise rearranged and the inventory management system (which, as described below, may include one or more software applications executing on a computer system) may be updated to reflect the type, quantity, condition, cost, location or any other suitable parameters with respect to newly received items 235. It is noted that items 235 may be stocked, managed or dispensed in terms of countable, individual units or multiples of units, such as packages, cartons, crates, pallets or other suitable aggregations. Alternatively, some items 235, such as bulk products, commodities, etc., may be stored in continuous or arbitrarily divisible amounts that may not be inherently organized into countable units. Such items 235 may be managed in terms of measurable quantities such as units of length, area, volume, weight, time duration or other dimensional properties characterized by units of measurement. Generally speaking, a quantity of an item 235 may refer to either a countable number of individual or aggregate units of an item 235 or a measurable amount of an item 235, as appropriate.

After arriving through receiving area 220, items 235 may be stored within inventory area 230 on an inventory shelf. In some implementations, like items 235 may be stored or displayed together in bins, on shelves or via other suitable storage mechanisms, such that all items 235 of a given kind are stored in one location. In other implementations, like items 235 may be stored in different locations. For example, to optimize retrieval of certain items 235 having high turnover or velocity within a large physical facility, those items 235 may be stored in several different locations to reduce congestion that might occur at a single point of storage.

When an order specifying one or more items 235 is received, or as an agent progresses through the materials handling facility 200, the corresponding items 235 may be selected or "picked" from the inventory area 230. For example, in one implementation, an agent may have a list of items to pick and may progress through the materials handling facility picking items 235 from the inventory area 230. In other implementations, materials handling facility employees (referred to herein as agents) may pick items 235 using written or electronic pick lists derived from orders. In some instances, an item may need to be repositioned from one location within the inventory area 230 to another location. For example, in some instances, an item may be picked from its inventory location, moved a distance and placed at another location.

As discussed further below, as the agent moves through the materials handling facility, images of the agent may be obtained and processed by the re-identification system to maintain a tracklet corresponding to the agent, a tracklet score may be also be determined indicating a confidence that the position of the agent is known, and/or to re-identify agents.

Figure 3:
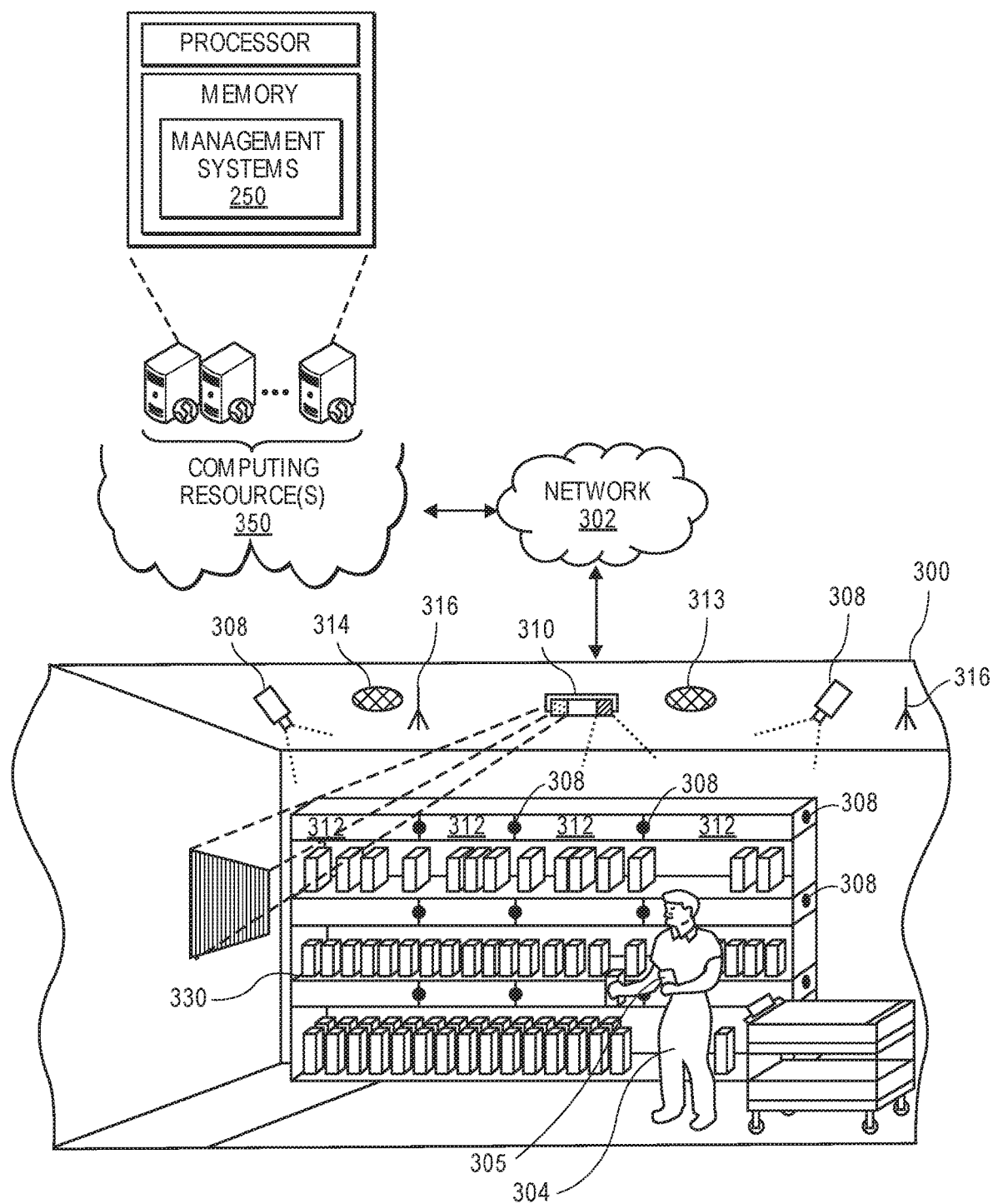
FIG. 3 shows additional components of the materials handling facility of FIG. 2 in accordance with implementations of the present disclosure.

FIG. 3 shows additional components of a materials handling facility 300, according to one implementation. Generally, the materials handling facility 300 may include one or more image capture devices, such as cameras 308. For example, one or more cameras 308 may be positioned in locations of the materials handling facility 300 so that images of locations, items, and/or agents within the materials handling facility can be captured. In some implementations, the image capture devices 308 may be positioned overhead, such as on the ceiling, and oriented toward a surface (e.g., floor) of the material handling facility so that the image capture devices 308 are approximately perpendicular with the surface and the field of view is oriented toward the surface. The overhead image capture devices may then be used to capture images of agents and/or locations within the materials handling facility from an overhead view. In addition, in some implementations, one or more cameras 308 may be positioned on or inside of inventory areas. For example, a series of cameras 308 may be positioned on external portions of the inventory areas and positioned to capture images of agents and/or the location surrounding the inventory area.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, a light curtain may be virtually positioned to cover the front of an inventory area and detect when an object (e.g., an agent's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 304 arrives at the materials handling facility 300, one or more images of the agent 304 may be captured and processed as discussed herein. For example, the images of the agent 304 may be processed to identify the agent and/or generate a feature set that includes embedding vectors representative of the agent. In some implementations, rather than or in addition to processing images to identify the agent 304, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, biometrics may be utilized to identify the agent, a smart phone or other device associated with the agent may be detected and/or scanned, etc.

For example, an agent 304 located in the materials handling facility 300 may possess a portable device 305 that is used to identify the agent 304 when they enter the materials handling facility and/or to provide information about items located within the materials handling facility 300, receive confirmation that the inventory management system has correctly identified items that are picked and/or placed by the agent, receive requests for confirmation regarding one or more event aspects, etc. Generally, the portable device has at least a wireless module to facilitate communication with the management systems 250 (e.g., the inventory management system) and a display (e.g., a touch based display) to facilitate visible presentation to and interaction with the agent. The portable device may store a unique identifier and provide that unique identifier to the management systems 250 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management systems 250. Likewise, components of the management systems 250 may interact and communicate with the portable device as well as identify the agent, communicate with the agent via other means and/or communicate with other components of the management systems 250.

Generally, the management systems 250 may include one or more input/output devices, such as imaging devices (e.g., cameras) 308, projectors 310, displays 312, speakers 313, microphones 314, multiple-camera apparatus, illumination elements (e.g., lights), etc., to facilitate communication between the management systems 250 and/or the agent and detection of items, events and/or other actions within the materials handling facility 300. In some implementations, multiple input/output devices may be distributed within the materials handling facility 300. For example, there may be multiple imaging devices, such as cameras located on the ceilings and/or cameras (such as pico-cameras) located in the aisles near the inventory items.

Likewise, the management systems 250 may also include one or more communication devices, such as wireless antennas 316, which facilitate wireless communication (e.g., Wi-Fi, Near Field Communication (NFC), Bluetooth) between the management systems 250 and other components or devices. The management systems 250 may also include one or more computing resource(s) 350, such as a server system, that may be local to the environment (e.g., materials handling facility), remote from the environment, or any combination thereof.

The management systems 250 may utilize antennas 316 within the materials handling facility 300 to create a network 302 (e.g., Wi-Fi) so that the components and devices can connect to and communicate with the management systems 250. For example, when the agent picks an item 335 from an inventory area 330, a camera of the multiple-camera apparatus 327 may detect the removal of the item and the management systems 250 may receive information, such as image data of the performed action (item pick from the inventory area), identifying that an item has been picked from the inventory area 330. The event aspects (e.g., agent identity, action performed, item involved in the event) may then be determined by the management systems 250.

Figure 4:
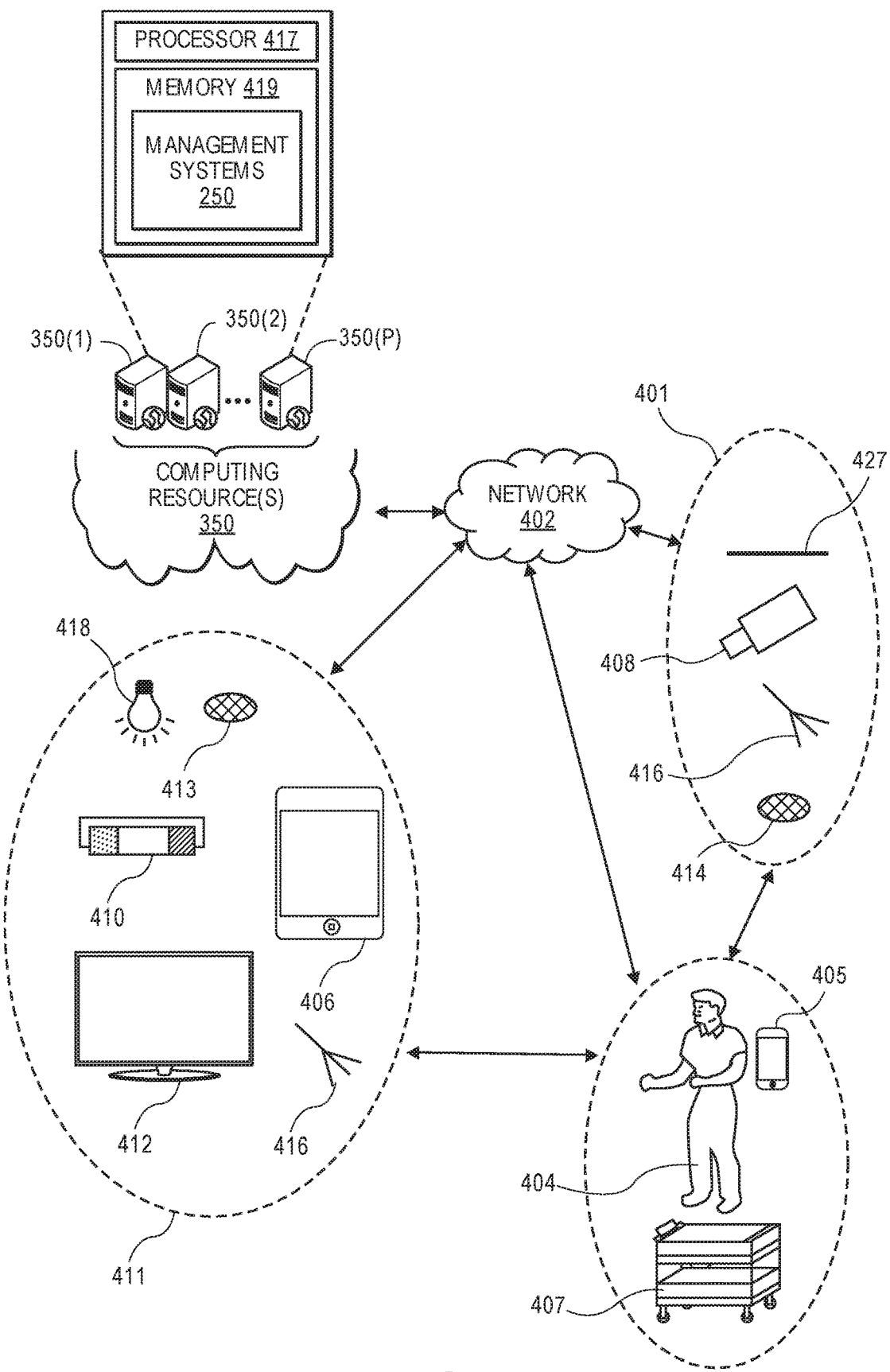
FIG. 4 shows components and communication paths between component types utilized in a materials handling facility of FIG. 1 in accordance with implementations of the present disclosure.

FIG. 4 shows example components and communication paths between component types utilized in a materials handling facility 200, in accordance with one implementation. A portable device 405 may communicate and interact with various components of management systems 250 over a variety of communication paths. Generally, the management systems 250 may include input components 401, output components 411 and computing resource(s) 350. The input components 401 may include an imaging device 408, a multiple-camera apparatus 427, microphone 414, antenna 416, or any other component that is capable of receiving input about the surrounding environment and/or from the agent. The output components 411 may include a projector 410, a portable device 406, a display 412, an antenna 416, a radio, speakers 413, illumination elements 418 (e.g., lights), and/or any other component that is capable of providing output to the surrounding environment and/or the agent.

The management systems 250 may also include computing resource(s) 350. The computing resource(s) 350 may be local to the environment (e.g., materials handling facility), remote from the environment, or any combination thereof. Likewise, the computing resource(s) 350 may be configured to communicate over a network 402 with input components 401, output components 411 and/or directly with the portable device 405, an agent 404 and/or a tote 407.

As illustrated, the computing resource(s) 350 may be remote from the environment and implemented as one or more servers 350(1), 350(2), . . . , 350(P) and may, in some instances, form a portion of a network-accessible computing platform implemented as a computing infrastructure of processors, storage, software, data access, and so forth that is maintained and accessible by components/devices of the management systems 250 and/or the portable device 405 via a network 402, such as an intranet (e.g., local area network), the Internet, etc. The server system 350 may process images of an agent to identify the agent, process images of items to identify items, determine a location of items and/or determine a position of items. The server system(s) 350 does not require end-user knowledge of the physical location and configuration of the system that delivers the services. Common expressions associated for these remote computing resource(s) 350 include "on-demand computing," "software as a service (SaaS)," "platform computing," "network-accessible platform," "cloud services," "data centers," and so forth.

Each of the servers 350(1)-(P) include a processor 417 and memory 419, which may store or otherwise have access to a management systems 250, which may include or provide image processing (e.g., for agent identification, expression identification, and/or item identification), inventory tracking, and/or location determination.

The network 402 may utilize wired technologies (e.g., wires, USB, fiber optic cable, etc.), wireless technologies (e.g., radio frequency, infrared, NFC, cellular, satellite, Bluetooth, etc.), or other connection technologies. The network 402 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 5A:
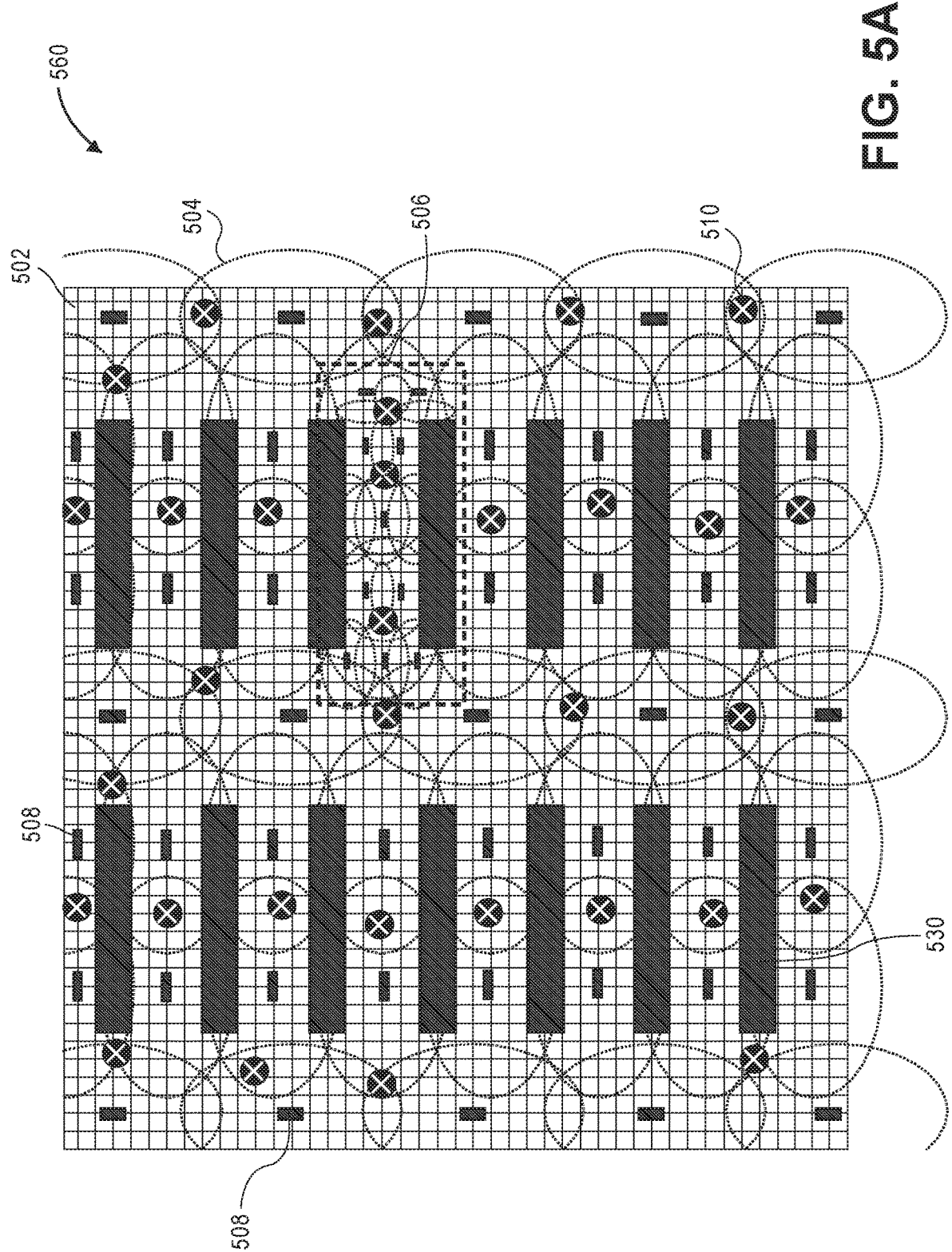
FIGS. 5A through 5B are a block diagrams of overhead views of a plurality of cameras in a materials handling facility in accordance with implementations of the present disclosure.

FIG. 5A is a block diagram of an overhead view of a portion of a materials handling facility 560, according to an implementation. In this example, a plurality of cameras 508 are positioned overhead (e.g., on a ceiling) at defined locations so that the collective field of view of the cameras covers the entire surface of the portion of the materials handling facility 560. In some implementations, a grid 502 system, physical or virtual, is oriented with the shape of the materials handling facility (e.g., oriented with the walls of the materials handling facility). The grid 502 may be utilized to attach or mount cameras within the materials handling facility 560 at defined locations with respect to the physical space of the materials handling facility. For example, in some implementations, the cameras may be positioned at any one foot increment from other cameras along the grid.

By mounting the cameras overhead at defined locations along the grid, the cameras can be associated with physical coordinates within the materials handling facility. For example, if the portion of the materials handling facility 560 represents the north-west corner of a materials handling facility, the grid 502 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection and any connected cameras is known. In this example, camera 508A is positioned at grid coordinate B:3, which corresponds to the horizontal coordinate of the camera being positioned approximately two feet by three feet from the origin (in this example the upper left corner) of the cluster.

Because the field of view 504 of the cameras 508 may not by circular, the cameras may be placed at defined directions (e.g., 0, 90, 180, 270 degrees). The direction of the camera may be determined based on the field of view 504 coverage of adjacent cameras and/or the layout of objects on the surface of the materials handling facility. For example, if the camera 508 is being mounted above an aisle between two inventory locations, the direction of the camera may be set so that the larger portion of the field of view 504 of the camera covers the length of the aisle.

The height of the cameras from the surface, the distance between camera placement and/or direction of the cameras 508 may vary depending on the layout of the materials handling facility, the lighting conditions in the cluster, the volume of agents expected to pass through a portion of the cluster, the activities and/or volume of activities expected to occur at different locations within the cluster, etc. For example, cameras may typically be mounted horizontally every three to four feet in one direction and every four to five feet in another direction along the grid 502 so that the field of view of each camera overlaps, as illustrated in FIG. 5.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of agents being within a field of view of a camera at all times. If the field of view of the cameras did not overlap until they were approximately three feet above the surface, as an agent moves between the fields of view, the portion of the agent that is taller than approximately three feet would exit one field of view and not enter the next field of view until the agent has moved into that range of the camera. As such, a portion of the agent is not detectable as they transition between fields of view. Likewise, by overlapping the fields of view of multiple cameras, each of the overlapping cameras may capture images that include representations of the agent from slightly different perspectives.

While this example describes overlapping camera fields of view at approximately seven feet above the surface of the materials handling facility, in other implementations, the cameras may be positioned so that the fields of view begin to overlap at different heights (e.g., six feet, eight feet) and/or so that some fields of view do not overlap, as discussed further below with respect to FIG. 5B.

In some areas, such as area 506, cameras 508 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, agent dwell time), high traffic areas, high value items, poor lighting conditions, etc. By increasing the amount of coverage, the image data increases, thereby increasing the likelihood that an activity or action will be properly determined. In other implementations, as illustrated and discussed below with respect to FIG. 5B, fewer cameras may be positioned in areas or all of a materials handling facility to reduce processing requirements, bandwidth constraints, and production/maintenance costs. In such an implementation, agents may move in and out of fields of view more frequently and be re-identified on a periodic basis, as discussed herein.

In some implementations, one or more markers 510 may be positioned throughout the materials handling facility and used to aid in alignment of the cameras 508. The markers 510 may be placed at any location within the materials handling facility. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 510 may be placed on the surface of the materials handling facility. In other implementations, the markers 510 may be placed on a visible surface of an inventory location 530. In still other implementations, the inventory location 530 itself may be utilized as a marker. Alternatively, or in addition thereto, one or more inventory items that are viewable by the cameras may be used as the marker 510. In still other examples, the surface of the materials handling facility may have a detectable pattern, marks, defects, etc., that can be determined and used as markers 510 to align cameras.

In some implementations, the markers 510 may be temporarily placed at locations within the materials handling facility and used to calibrate the cameras. During calibration, the cameras may be aligned with respect to one another by aligning the position of the markers 510 in each camera's field of view. Likewise, the field of view of each camera may be determined and associated with coordinates of the materials handling facility.

The cameras 508 may obtain images (still images or video) and process those images to reduce the image data and/or provide the image data to other components. As discussed herein, image data for each image or frame may be reduced using background/foreground segmentation to only include pixel information for pixels that have been determined to have changed. For example, baseline image information may be maintained for a field of view of a camera corresponding to the static or expected view of the materials handling facility. Image data for an image may be compared to the baseline image information and the image data may be reduced by removing or subtracting out pixel information that is the same in the image data as the baseline image information. Image data reduction may be done by each camera. Alternatively, groups of cameras may be connected with a camera processor that processes image data from a group of cameras to reduce the image data of those cameras.

Figure 5B:
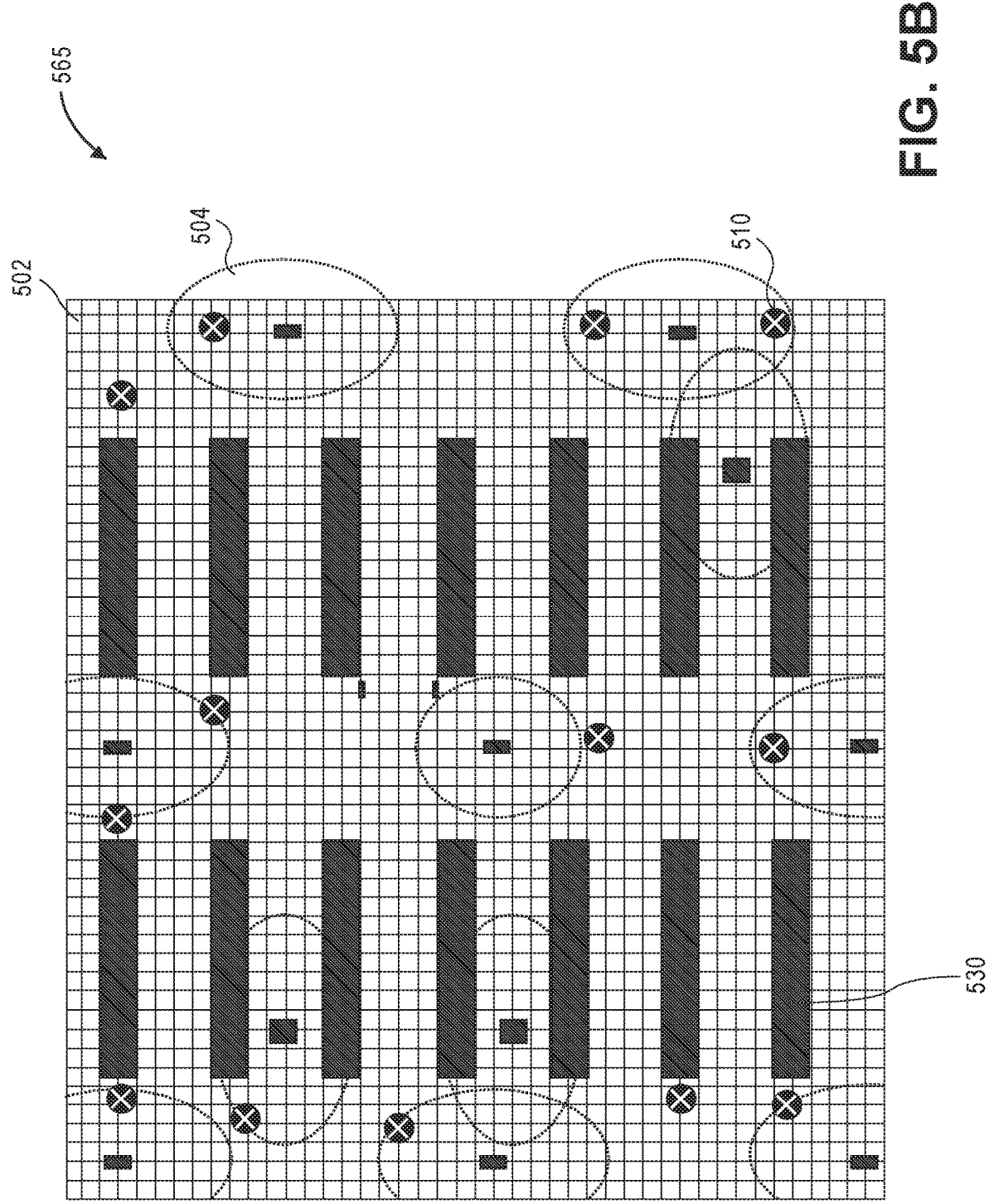

FIG. 5B is a block diagram of another overhead view of a portion of a materials handling facility 565, according to an implementation. In this example, there are fewer cameras than illustrated in FIG. 5A, thereby resulting in less overlap between fields of view and portions of the materials handling facility that are not covered by a field of view 504 of one or more imaging devices 508. As agents move in and out of fields of view 504 the corresponding tracklets may become or have a low confidence score indicating a confidence that the position of the agent is known. For example, an agent may be represented by a tracklet and there may be a high confidence score that the tracklet properly represents that agent at a position when in the field of view of an imaging device. When the agent moves out of the field of view, the confidence score may move below a threshold. When the agent appears in another field of view of another imaging device, the tracklet may maintain the low confidence score and the agent may be re-identified, as discussed herein.

As is discussed above, one or more imaging devices of the present disclosure, or one or more other computer processors, systems or resources, may be programmed to execute a machine learning system or technique for re-identification of actors, for determining which of the pixels expressed within the imaging data is most likely associated with one of such agents, and for calculating a confidence score or other metric reflective of confidence in the determined association between two sets of embedding vectors.

Figure 6:
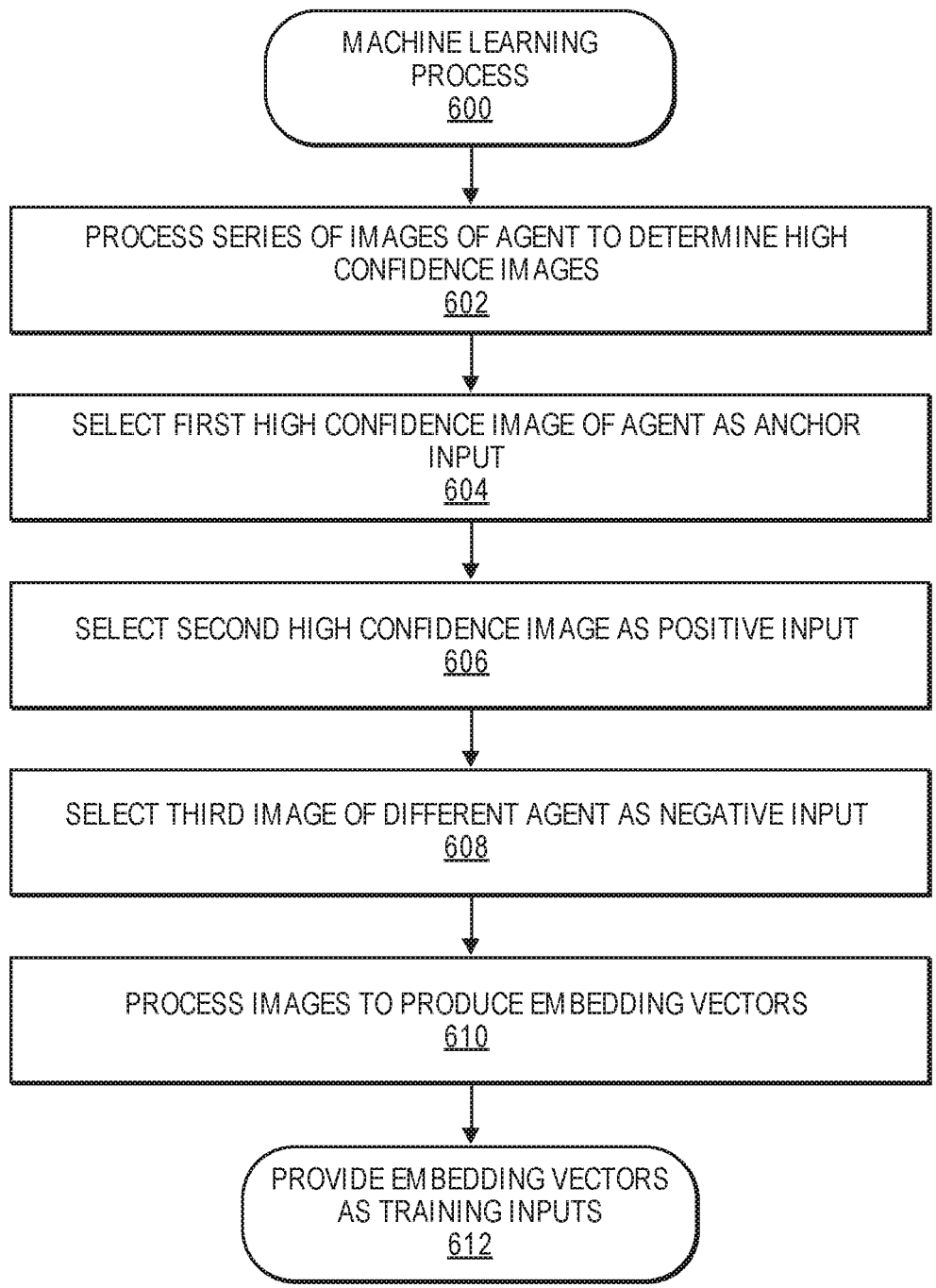
FIG. 6 is a flow chart of one process for machine learning training using embedding vectors in accordance with implementations of the present disclosure.

As discussed herein, embedding vectors may be used as training inputs to a machine learning system that is used to re-identify agents within a materials handling facility and/or as inputs to the training of a machine learning system for re-identification. Likewise, in some implementations, embedding vectors that have been used to re-identify an agent may likewise be used as a training input to provide ongoing training and optimization of the machine learning system. For example, FIG. 6 is a flow diagram of an example machine learning training process 600, according to an implementation.

The example process 600 may be performed to initially train a machine learning system and/or may be periodically performed to update and further improve the accuracy of a trained machine learning system. The example process 600 begins by processing a series of images or video of an agent to determine high confidence images from the series, as in 602. For example, a video of an agent moving through a materials handling facility for a defined period of time (e.g., 3 minutes) may be processed to determine images from the video in which the system has a high confidence of the agent represented in the video. An anchor image is an image that is processed, as discussed herein, to produce an anchor or known set of embedding vectors representative of the agent.

A first high confidence image is then selected as an anchor input to the machine learning system, as in 604. An anchor input may be any image in which there is a high confidence that the image represents the agent. Likewise, a second high confidence image of the agent is selected as a positive input for the machine learning system, as in 606. A positive image is another image of the agent that is processed to produce a second set of embedding vectors representative of the agent.

In addition, a third image that represents a second agent that is different than the agent is also selected as a negative input to the machine learning system, as in 608. A negative input may be any image of an agent that is not the agent represented in the anchor input or the positive input.

Utilizing the implementations discussed herein, the three images are processed to produce respective embedding vectors, as in 610. Finally, those embedding vectors are provided as training inputs to the machine learning system, as in 612. The machine learning system receives the training inputs and compares the embedding vector generated from the anchor input with the embedding vector generated from the positive input to produce a first similarity score. Likewise, the embedding vector generated from the anchor input is also compared with the embedding vector produced from the negative input to produce a second similarity score. The machine learning system is trained such that there is a higher similarity between the anchor input and the positive input than between the anchor input and the negative input. As will be appreciated, this training may be performed using thousands or more triplets (anchor, positive, negative) sets of images and continually or periodically updated over time.

Figure 7:
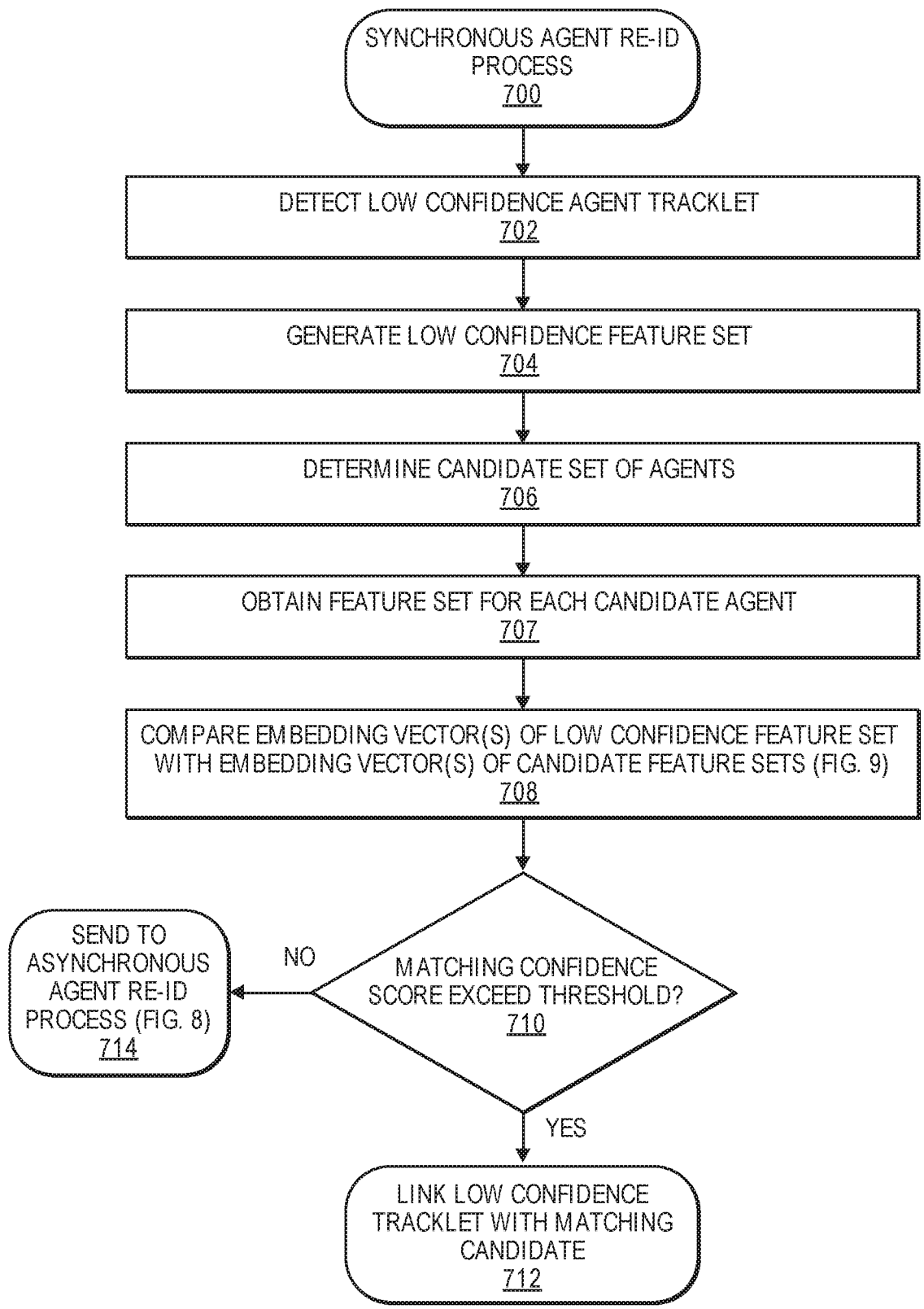
FIG. 7 is a flow chart of one process for synchronous agent re-identification using digital imagery and machine learning in accordance with implementations of the present disclosure.

FIG. 7 is a flow diagram of a synchronous agent re-identification process 700, according to an implementation. The example process 700 begins by detecting or determining an agent tracklet with a low confidence score, as in 702. As discussed above, tracklets and the positions of agents within a materials handling facility may be continuously or periodically tracked and a confidence score determined that is indicative of a confidence that the position of the agent is known. If the confidence score falls below a threshold, it is determined that the tracklet has a low confidence score because the system is not confident that the tracklet still corresponds to the position of the same agent. For example, if two agents pass close by one another, one or both of the corresponding tracklets may transition to a low confidence score indicating that the tracklets may have inaccurately swapped tracking of the two agents. As another example, a tracklet may transition to a low confidence score if an agent moves out of a field of view of the imaging device(s) (e.g., into an untracked area), becomes occluded by one or more other objects, etc.

The threshold may be any defined amount and may be the same or different for different agents, different locations within the materials handling facility, the same or different for different times of days, different days of the week, different days of the year, etc.

Upon detecting a tracklet with a low confidence score, one or more images of the agent associated with the tracklet at the current position are obtained and processed to generate a low confidence feature set that includes one or more embedding vectors representative of the agent at the current position, as in 704. The feature set may be generated using the techniques discussed above and may include embedding vectors generated from imaging data obtained from one or more imaging devices that are captured at one or more periods of time while the agent is at the current position. In some implementations, the embedding vectors generated and used with the example process 700 may be low dimensional embedding vectors that can be quickly generated by the machine learning system with less computation power. For example, the embedding vectors may be based on a limited number of attributes about the agent, such as color and size. In other implementations, other attributes may be considered.

A candidate set of agents that may be the agent represented by the tracklet with the low confidence score may also be determined, as in 706. The candidate set of agents may include one or more agents. In some implementations, the candidate set of agents may include all agents currently located in the materials handling facility and/or located within the materials handling facility within a defined period of time surrounding the time at which the tracklet with the low confidence score is determined. In other implementations, an area surrounding the current position may be determined and only agents within that area may be included in the candidate set. The area may be a defined area around the tracklet and/or may be determined based on a trajectory of the agent, speed or velocity of the agent, a time since the tracklet went into a low confidence score, etc. For example, if the tracklet has been in low confidence for five seconds, the area surrounding the current position may have a first size. In comparison if the tracklet has been in low confidence for thirty seconds, the area surrounding the current position may have a second size that is larger than the first size. The size and/or position of the area may be expanded or contracted around the current position to reflect or include candidate agents that could possibly be the agent.

In still other examples, the candidate set of agents may only include other agents corresponding to tracklets with low confidence scores. For example, if two agents pass one another in close proximity and/or move out of fields of view of one or more imaging devices such that the tracklets of both agents transition to a low confidence score, the candidate set may include both agents.

Finally, for each candidate agent, a feature set representative of the agent is obtained, as in 707. In some implementations, the feature set for each candidate agent may be maintained in a data store and accessible for agent re-identification. In such an example, the features sets may only include embedding vectors representative of the respective agent when the agent was associated with a tracklet having a high confidence score; thereby ensuring that the embedding vectors are indeed representative of that agent. Like the embedding vectors generated for the agent corresponding to the low confidence agent tracklet, the embedding vectors for the candidate agents may be lower dimensional embedding vectors.

One or more embedding vectors of the low confidence tracklet feature set are then compared with one or more embedding vectors of each candidate feature set to determine a matching confidence score for a candidate agent having a highest similarity score, as in 708, and as discussed in further detail below with respect to FIG. 9.

A determination is then made as to whether the matching confidence score for the candidate agent exceeds a matching threshold, as in 710. The matching threshold may be any defined amount or value and may vary for different agents, different locations within the materials handling facility, for different times of day, days of week, weeks of year, etc.

If it is determined that the matching confidence score exceeds the threshold, it is determined that the agent with the highest matching confidence score is the same as the agent with the tracklet having the low confidence score. The determined agent is linked to the tracklet and the position of the agent is updated to the current position, as in 712. In comparison, if it is determined that the matching confidence score does not exceed the matching threshold, the image data of the agent associated with the tracked having the low confidence score is sent for additional processing using the asynchronous agent re-identification process, as in 714, and as discussed further below with respect to FIG. 8. In other implementations, rather than sending the image data for additional processing by the asynchronous agent re-identification process, the image data may be sent for manual review. During manual review, one or more individuals may review images of the agent at the current position and compare those images with images of candidate agents in an effort to reestablish a link between the agent at the current position and an agent within the materials handling facility, so that the current position of the agent can be updated. In still other examples, it may be determined whether an event or other activity has occurred that necessitates re-identification (e.g., agent identification is needed to associate the agent with an action such as a pick or place of an item). If it is determined that no event or activity has transpired, no additional processing may be performed.

Figure 8:
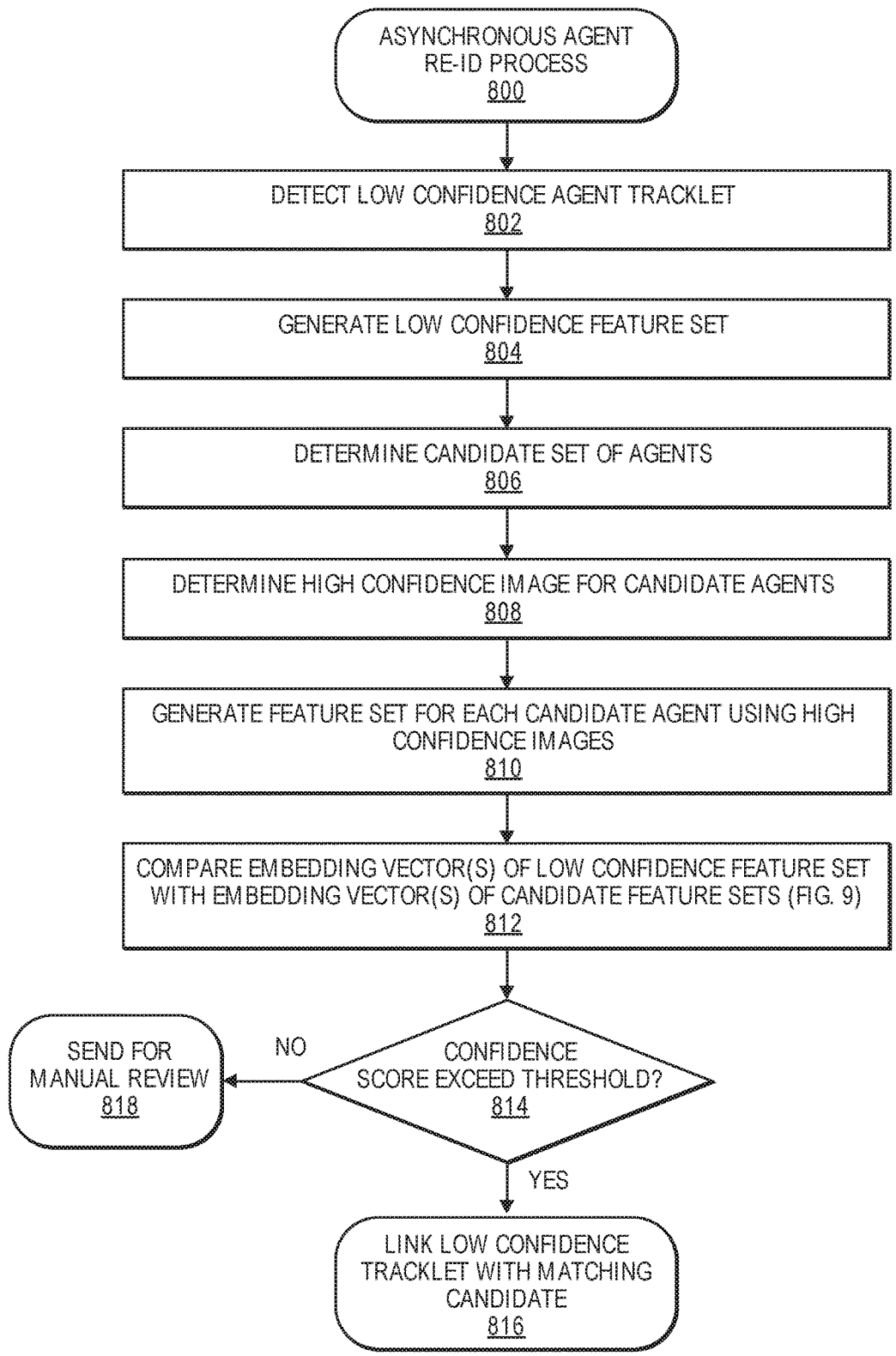
FIG. 8 is a flow chart of one process for asynchronous agent re-identification using digital imagery and machine learning in accordance with implementations of the present disclosure.

FIG. 8 is a flow diagram of an asynchronous agent re-identification process 800, according to an implementation. The example process 800 begins by detecting or determining an agent tracklet with a low confidence score, as in 802. As discussed above, tracklets and the positions of agents within a materials handling facility may be continuously or periodically tracked and a confidence score determined that is indicative of a confidence that the position of the agent is known. If the confidence score falls below a threshold, it is determined that the tracklet has a low confidence score because the system is not confident that the tracklet still corresponds to the position of the same agent. For example, if two agents pass close by one another, one or both of the corresponding tracklets may transition to a low confidence score indicating that the tracklets may have inaccurately swapped tracking of the two agents. As another example, a tracklet may transition to a low confidence score if an agent moves out of a field of view of the imaging device(s) (e.g., into an untracked area), becomes occluded by one or more other objects, etc.

The threshold may be any defined amount and may be the same or different for different agents, different locations within the materials handling facility, the same or different for different times of days, different days of the week, different days of the year, etc.

Upon detecting a tracklet with a low confidence score, one or more images of the agent associated with the tracklet at the current position are obtained and processed to generate a low confidence feature set that includes one or more embedding vectors representative of the agent at the current position, as in 804. The feature set may be generated using the techniques discussed above and may include embedding vectors from one or more imaging devices that are captured at one or more periods of time while the agent is at the current position. In comparison, asynchronous agent re-identification may utilize additional processing to generate higher dimensional embedding vectors that consider and represent additional attributes of the object.

A candidate set of agents that may be the agent represented by the tracklet with the low confidence score may also be determined, as in 806. The candidate set of agents may include one or more agents. In some implementations, the candidate set of agents may include all agents currently located in the materials handling facility and/or located within the materials handling facility within a defined period of time surrounding the time at which the tracklet with the low confidence score is determined. In other implementations, an area surrounding the current position may be determined and only agents within that area may be included in the candidate set. The area may be a defined area around the tracklet and/or may be determined based on a trajectory of the agent, speed or velocity of the agent, a time since the tracklet went into a low confidence score, etc. For example, if the tracklet has been in low confidence for five seconds, the area surrounding the current position may have a first size. In comparison if the tracklet has been in low confidence for thirty seconds, the area surrounding the current position may have a second size that is larger than the first size. The size and/or position of the area may be expanded or contracted around the current position to reflect or include candidate agents that could possibly be the agent.

In still other examples, the candidate set of agents may only include other agents corresponding to tracklets with low confidence scores. For example, if two agents pass one another in close proximity and/or move out of fields of view of one or more imaging devices such that the tracklets of both agents transition to a low confidence score, the candidate set may include both agents.

For each candidate agent, one or more high confidence digital images representative of the agent are determined, as in 808. For example, rather than maintaining a feature set for each agent in a data store, when agent re-identification is to be performed, a digital image of each candidate agent when the agent was linked to a tracklet at a point in time when the tracklet had a high confidence score is determined. The determined digital image(s) for each candidate agent are then processed as discussed herein to generate feature sets for each candidate agent that include embedding vectors representative of the candidate agent, as in 810. In this example process 800, the embedding vectors may be generated to a higher dimensionality than performed with the synchronous re-identification process discussed above with respect to FIG. 7. While generating higher dimensional embedding vectors may take additional time and computing capacity, the comparison and resulting accuracy may be higher than comparing lower dimensional attributes. By first performing the synchronous re-identification process 700 using lower dimensional embedding vectors and then performing asynchronous re-identification if a high enough confidence score cannot be achieved with the example process 700, the load and processing time is balanced between speed and accuracy of identification.

One or more embedding vectors of the low confidence tracklet feature set are then compared with one or more embedding vectors of each candidate feature set to determine a matching confidence score for a candidate agent having a highest similarity score, as in 812, and as discussed in further detail below with respect to FIG. 9.

A determination is then made as to whether the matching confidence score for the candidate agent exceeds a matching threshold, as in 814. The matching threshold may be any defined amount or value and may vary for different agents, different locations within the materials handling facility, for different times of day, days of week, weeks of year, etc.

If it is determined that the matching confidence score exceeds the threshold, it is determined that the agent with the highest matching confidence score is the same as the agent with the tracklet having the low confidence score. The determined agent is linked to the tracklet and the position of the agent is updated to the current position, as in 816. In comparison, if it is determined that the matching confidence score does not exceed the matching threshold, the image data of the agent associated with the tracked having the low confidence score is sent for manual review, as in 818. During manual review, one or more individuals may review images of the agent at the current position and compare those images with images of candidate agents in an effort to reestablish a link between the agent at the current position and an agent within the materials handling facility, so that the current position of the agent can be updated.

Figure 9:
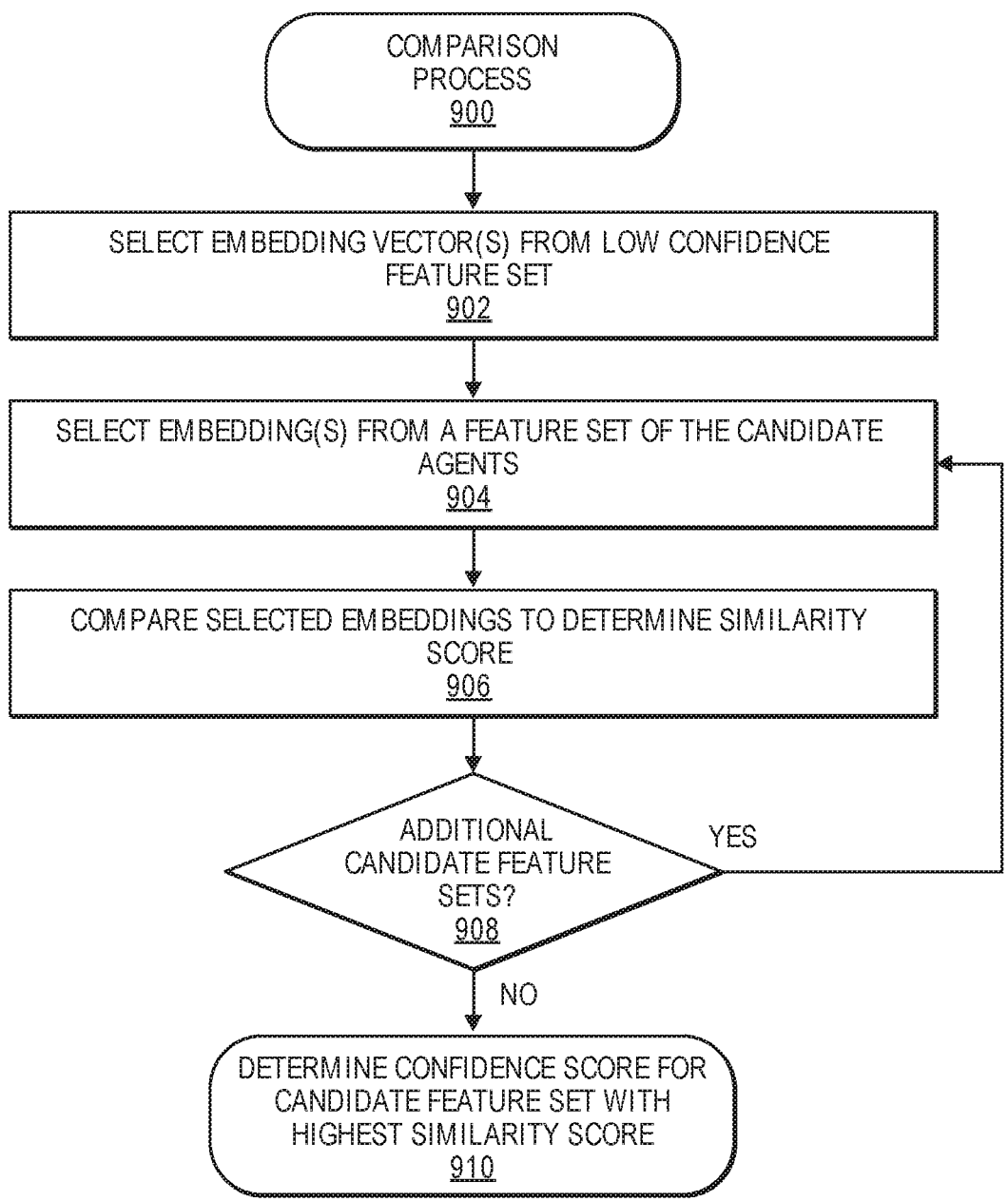
FIG. 9 is a flow chart of one process for comparing embedding vectors of feature sets in accordance with implementations of the present disclosure.

FIG. 9 is a flow diagram of an example embedding vectors comparison process 900, according to an implementation. The example process 900 begins by selecting one or more embedding vectors from the feature set representative of the agent at the current position with the tracklet having the low confidence score, as in 902. In a similar manner, embedding vectors from each of the candidate feature sets are selected as representative of the candidate agents, as in 904.

The selected embedding vectors of the feature set corresponding to the tracklet with the low confidence score are then compared to the selected embedding vectors included in the feature set of a candidate agent to determine a similarity score indicative of a similarity between the embedding vector(s) representative of the agent at the current position and the embedding vector(s) representative of the candidate agent, as in 906. Using a trained machine learning system, embedding vectors representative of the same agent will be closer or more similar than embedding vectors representative of different agents.

A determination is then made as to whether additional candidate feature sets are to be compared with the selected embedding vectors representative of the agent at the current location, as in 908. If it is determined that additional candidate feature sets remain, the example process 900 returns to block 904 and continues. In comparison, if it is determined that all the candidate feature sets have been processed, a confidence score for a candidate feature set with a highest similarity score is determined, as in 910.

The confidence score represents a level of confidence that the potentially matching candidate agent with a highest similarity score corresponds to the agent at the current position. In some implementations, the confidence score may be determined based on a ratio of the similarity scores, based on a comparison of the highest similarity score with other high similarity scores, etc. For example, if the highest similarity score is 98%, the second highest similarity score is 25% and the third highest similarity score is 22%, the resulting confidence score may be high because the highest similarity score is high and there is a large difference between the highest similarity score and the next highest similarity score. As another example, if the highest similarity score is 98% and the next highest similarity score is 97%, the resulting confidence score that the potentially matching candidate agent corresponds to the agent at the current position may be low because either of the two potentially matching candidate agents could be the agent at the current position.

While the example illustrated with respect to FIG. 9 describes determining confidence scores and corresponding similarity scores based on the ratio of the highest similarity scores, in other implementations, the similarity scores may be determined and if a similarity score exceeds a similarity threshold, it may be determined that the candidate agent with the similarity score that exceeds the threshold is the agent at the current position.

Figure 10:
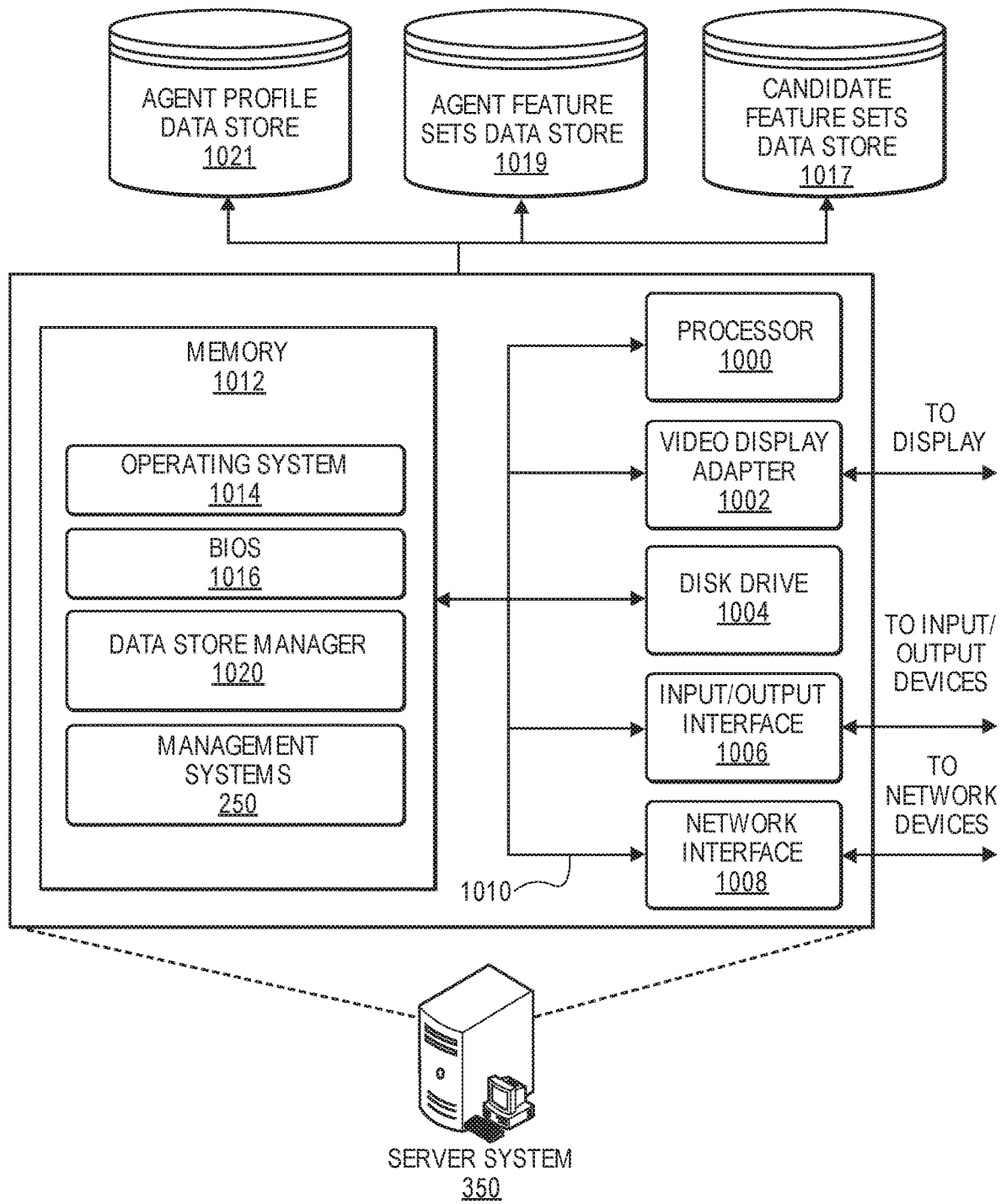
FIG. 10 is a block diagram of an illustrative implementation of a server system that may be used with various implementations.

FIG. 10 is a pictorial diagram of an illustrative implementation of a server system, such as the server system 350 that may be used in the implementations described herein. The server system illustrated in FIG. 10 or another similar server system may be configured to operate as the cluster processing system, the cluster aggregation system and/or for the management systems 250 (inventory management system, re-identification system).

The server system 350 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display permitting an operator of the server system 350 to monitor and configure operation of the server system 350. The input/output interface 1006 likewise communicates with external input/output devices, such as a mouse, keyboard, scanner, or other input and output devices that can be operated by an operator of the server system 350. The network interface 1008 includes hardware, software, or any combination thereof, to communicate with other computing devices. For example, the network interface 1008 may be configured to provide communications between the server system 350 and other computing devices via the network 402, as shown in FIG. 4.

The memory 1012 may be a non-transitory computer readable storage medium configured to store executable instructions accessible by the processor(s) 1000. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1008.

The memory 1012 is shown storing an operating system 1014 for controlling the operation of the server system 350. A binary input/output system (BIOS) 1016 for controlling the low-level operation of the server system 350 is also stored in the memory 1012. The memory 1012 additionally stores computer executable instructions, that, when executed by the processor 1000 cause the processor to perform one or more of the processes discussed herein. The memory 1012 additionally stores program code and data for providing network services. The data store manager application 1020 facilitates data exchange between the data stores 1017, 1019, 1021 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 350 can include any appropriate hardware and software for integrating with the data stores 1017, 1019, 1021 as needed to execute aspects of the management systems 350.

The data stores 1017, 1019, 1021 can include several separate data tables, databases or other data storage mechanisms and media for storing data relating to a particular aspect. For example, the data stores 1017, 1019, 1021 illustrated include mechanisms for maintaining agent profiles and features sets that include embedding vectors representative of agents, etc. Depending on the configuration and use of the server system 350, one or more of the data stores may not be included or accessible to the server system 350 and/or other data store may be included or accessible.

It should be understood that there can be many other aspects that may be stored in the data stores 1017, 1019, 1021. The data stores 1017, 1019, 1021 are operable, through logic associated therewith, to receive instructions from the server system 350 and obtain, update or otherwise process data in response thereto.

The memory 1012 may also include the inventory management system, and/or the re-identification system. The corresponding server system 350 may be executable by the processor 1000 to implement one or more of the functions of the server system 350. In one implementation, the server system 350 may represent instructions embodied in one or more software programs stored in the memory 1012. In another implementation, the system 350 can represent hardware, software instructions, or a combination thereof.

The server system 350, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although some of the implementations disclosed herein reference the association of human agents with respect to locations of events or items associated with such events, the systems and methods of the present disclosure are not so limited. For example, the systems and methods disclosed herein may be used to associate any non-human animals, as well as any number of machines or robots, with events or items of one or more types. The systems and methods disclosed herein are not limited to recognizing and detecting humans, or re-identification of humans.

Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 7 through 9, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   maintaining, for each of a plurality of agents located in a materials handling facility, a tracklet confidence score indicating a confidence that a position of the agent is known;
   maintaining, in a data store and for each of the plurality of agents, a feature set, each feature set including at least:
      a first embedding vector indicative of first attributes of the agent determined from a first digital image of the agent within the materials handling facility, the first digital image generated by at least one of a plurality of digital cameras positioned within the materials handling facility and while the agent is in the materials handling facility; and
      a second embedding vector indicative of second attributes of the agent, wherein the second embedding vector is different than the first embedding vector and is generated from at least one of:
         a second digital image of a second field of view that is different than a first field of view of the first digital image; or
         a third digital image that is generated at a different time than the first digital image;
   determining that a first tracklet confidence score for a first agent of the plurality of agents has fallen below a first threshold;
   in response to determining that the first tracklet confidence score has fallen below the first threshold, obtaining a fourth digital image of the first agent at a first position in the materials handling facility;
   processing the fourth digital image using machine learning to generate a third embedding vector indicative of attributes of the first agent;
   producing a first feature set, the first feature set including at least the third embedding vector;

determining a candidate set of agents of the plurality of agents that may correspond to the first agent, wherein the candidate set includes at least a second agent and a third agent;

comparing at least the third embedding vector of the first feature set with at least the first embedding vector and the second embedding vector of a second feature set of the second agent maintained in the data store to determine a first similarity score indicating a first similarity between the first feature set and the second feature set;

comparing at least the third embedding vector of the first feature set with at least the first embedding vector and the second embedding vector of a third feature set of the third agent maintained in the data store to determine a second similarity score indicating a second similarity between the first feature set and the third feature set;

determining, based at least in part on the first similarity score and the second similarity score, a first matching confidence score indicating a confidence that the first agent corresponds to the second agent;

determining that the first matching confidence score exceeds a second threshold;

in response to determining that the first matching confidence score exceeds the second threshold, determining that the first agent is the second agent; and storing the first position as a current position of the second agent.

2. The computer-implemented method of claim 1, wherein determining the candidate set of agents includes:
determining that a second tracklet confidence score for the second agent of the plurality of agents has fallen below the first threshold; and
determining that a third tracklet confidence score for the third agent of the plurality of agents has fallen below the first threshold.

3. The computer-implemented method of claim 1, wherein determining the candidate set of agents includes:
determining that a second position corresponding to the second agent is within a defined distance of the first position; and
determining that a third position corresponding to the third agent is within the defined distance of the first position.

4. The computer-implemented method of claim 3, wherein:
a fifth digital image of the second agent was captured when the second agent was at the second position;
the fifth digital image of the second agent was processed to produce a fourth embedding vector that is included in the second feature set of the second agent; and
a second tracklet confidence score exceeded the first threshold at a time when the fifth digital image of the second agent was captured.

5. A system, comprising:
one or more processors; and
a memory storing program instructions that when executed by the one or more processors cause the one or more processors to at least:
obtain a first image of a first agent at a first location;
determine a portion of the first image that is representative of the first agent, wherein the portion is less than the entire first image;
process the portion of the first image using machine learning to produce a first embedding vector indicative of one or more attributes of the first agent, wherein the first embedding vector is included in a first feature set corresponding to the first agent;

compare the first embedding vector with at least a second embedding vector and a third embedding vector of a second feature set corresponding to a second agent to determine a first similarity score indicative of a first similarity between the first feature set and the second feature set, wherein:
the second embedding vector is indicative of first attributes of the second agent determined from a first digital image of the second agent;
the third embedding vector is indicative of second attributes of the second agent, wherein the third embedding vector is different than the second embedding vector and is generated from at least one of:
a second digital image of a second field of view that is different than a first field of view represented in the first digital image; or
a third digital image that is generated at a different time than the first digital image;
compare the first embedding vector with at least a fourth embedding vector and a fifth embedding vector of a third feature set corresponding to a third agent to determine a second similarity score indicative of a second similarity between the first feature set and the third feature set;
determine, based at least in part on the first similarity score and the second similarity score, that the first agent is the second agent; and
update a position of the second agent to correspond to the first location.

6. The system of claim 5, wherein the program instructions when executed by the one or more processors are further configured to at least:
determine that a first tracklet confidence score indicating a confidence that a position of the first agent is known has fallen below a confidence threshold; and
in response to a determination that the first tracklet confidence score has fallen below the confidence threshold, determine that the first agent at the first location is to be identified.

7. The system of claim 5, wherein the program instructions when executed by the one or more processors are further configured to at least:
maintain, for each of the first agent, the second agent, and the third agent, a tracklet confidence score indicating a confidence that a position of the agent is known.

8. The system of claim 5, wherein the program instructions when executed by the one or more processors further cause the one or more processors to at least:
determine that a first tracklet confidence score indicating a first confidence that a second position of the second agent is known has fallen below a confidence threshold; and
determine at least the second embedding vector and the third embedding vector based at least in part on the first tracklet confidence score falling below the confidence threshold.

9. The system of claim 5, wherein the program instructions when executed by the one or more processors further cause the one or more processors to at least:
determine a confidence score for the second feature set based at least in part on a ratio between the first similarity score and the second similarity score; and
determine that the confidence score exceeds a confidence threshold; and wherein determination that the first agent is the second agent is further based at least in part on a determination that the confidence score exceeds the confidence threshold.

10. The system of claim 5, wherein the program instructions when executed by the one or more processors further cause the one or more processors to at least:
   determine a plurality of agents with low confidence tracklet scores, wherein:
      a tracklet score indicates a confidence that a position of the agent is known; and
      the second agent and the third agent are included in the plurality of agents;
   for each of the plurality of agents and to produce a plurality of embedding vectors:
      determine a high confidence digital image frame representative of the agent when the agent is at a position with a high confidence tracklet score; and
      process the high confidence digital image frame to produce an embedding vector indicative of at least a portion of the high confidence digital image frame.

11. The system of claim 5, wherein the program instructions when executed by the one or more processors further cause the one or more processors to at least:
   determine an area around the first location; and
   determine that the second agent and the third agent are within the area.

12. The system of claim 11, wherein the program instructions when executed by the one or more processors further cause the one or more processors to at least:
   determine a time duration since a tracklet score corresponding to the first agent went below a threshold, wherein the tracklet score indicates a confidence that a position of the first agent is known; and
   wherein a size of the area is based at least in part on the time duration.

13. The system of claim 5, wherein the program instructions that cause the one or more processors to compare the first embedding vector with at least the second embedding vector and the third embedding vector of the first feature set further include instructions that cause the one or more processors to at least:
   compare the first embedding vector with at least the second embedding vector and the third embedding vector of the first feature set using a trained machine learning model.

14. A computer-implemented method, comprising:
   determining that a first tracklet score for a first agent of a plurality of agents has fallen below a first threshold when the first agent is at a first position, wherein the first tracklet score indicates a confidence that a position of the first agent is known;
   determining a candidate set of agents of the plurality of agents that may correspond to the first agent, wherein the candidate set includes at least a second agent and a third agent;
   processing a digital image using machine learning to generate a first embedding vector indicative of first attributes of the first agent, wherein the first embedding vector is included in a first feature set corresponding to the first agent;
   comparing the first embedding vector with at least a second embedding vector and a third embedding vector of a second feature set corresponding to the second agent to determine a first similarity score indicating a first similarity between the first feature set and the second feature set, wherein:
      the second embedding vector is indicative of first attributes of the second agent determined from a first digital image of the second agent;
      the third embedding vector is indicative of second attributes of the second agent, wherein the third embedding vector is different than the second embedding vector and is generated from at least one of:
         a second digital image of a second field of view that is different than a first field of view represented in the first digital image; or
         a third digital image that is generated at a different time than the first digital image;
   comparing the first embedding vector with at least a fourth embedding vector and a fifth embedding vector of a third feature set corresponding to the third agent to determine a second similarity score indicating a second similarity between the first feature set and the third feature set;
   determining, based at least in part on the first similarity score and the second similarity score, a first confidence score indicating a confidence that the first agent corresponds to the second agent; and
   storing the first position as a current position of the second agent.

15. The computer-implemented method of claim 14, further comprising:
   determining an area around the first position; and
   wherein determining the candidate set of agents includes at least one of:
      determining agents at positions within the area;
      determining agents positioned within the area within a time duration of the first tracklet score falling below the first threshold; or
      determining agents having tracklet scores below the first threshold.

16. The computer-implemented method of claim 14, further comprising:
   providing the first embedding vector, the second embedding vector, and the fourth embedding vector to a machine learning system as training inputs; and
   wherein the first embedding vector is considered an anchor, the second embedding vector is considered a positive reinforcement, and the fourth embedding vector is considered a negative reinforcement.

17. The computer-implemented method of claim 14, further comprising:
   determining a trajectory of the first agent when the first tracklet score corresponding to the first agent went below the first threshold; and
   wherein the candidate set of agents of the plurality of agents is determined based at least in part on the trajectory.

18. The computer-implemented method of claim 14, further comprising:
   determining a ratio between the first similarity score and the second similarity score; and
   wherein the first confidence score is based at least in part on the ratio.

19. The computer-implemented method of claim 14, further comprising:
   determining that at least one of a size, a position, a color or a shape of the first agent has changed beyond an expected amount; and
   wherein determining that the first tracklet score has fallen below the first threshold is based at least in part on determining that at least one of the size, the position, the color, or the shape of the first agent has changed beyond the expected amount.

20. The computer-implemented method of claim 1, wherein the first embedding vector includes continuous data of floating point numbers indicative of the first attributes of the first agent.

21. A method, comprising:
processing a first digital image using machine learning to generate a first embedding vector that includes data indicative of first attributes of a first agent represented in the first digital image;
comparing the first embedding vector with a second embedding vector and a third embedding vector of a first feature set corresponding to a second agent to determine a first similarity score indicating a first similarity between the first embedding vector and the first feature set, wherein:
the second embedding vector is indicative of second attributes of the second agent determined from a second digital image of the second agent;
the third embedding vector is indicative of third attributes of the second agent, wherein the third embedding vector is different than the second embedding vector and is generated from at least one of:
a third digital image of a second field of view that is different than a first field of view of the second digital image; or
a fourth digital image that is generated at a different time than the second digital image;
determining, based at least in part on the first similarity score and a second similarity score, a confidence score indicating a confidence that the first agent corresponds to the second agent; and
in response to determining the confidence score, storing a position associated with the first agent as a current position of the second agent.

22. The method of claim 21, further comprising:
comparing the first embedding vector with a fourth embedding vector indicative of attributes of a third agent to determine the second similarity score indicating a second similarity between the first embedding vector and the third embedding vector.

23. The method of claim 21, further comprising:
determining that a tracklet confidence score indicating a confidence that the position of the first agent is known has fallen below a confidence threshold;
wherein the first digital image is processed in response to determining that the tracklet confidence score has fallen below the confidence threshold.

* * * * *